(12) United States Patent
Graves et al.

(10) Patent No.: US 6,721,510 B2
(45) Date of Patent: Apr. 13, 2004

(54) ATMOSPHERIC OPTICAL DATA TRANSMISSION SYSTEM

(75) Inventors: J. Elon Graves, Campbell, CA (US); Malcolm J. Northcott, Campbell, CA (US)

(73) Assignee: AOptix Technologies, Inc., Campbell, CA (US)

( * ) Notice: Subject to any disclaimer, the term of this patent is extended or adjusted under 35 U.S.C. 154(b) by 136 days.

(21) Appl. No.: 09/892,913

(22) Filed: Jun. 26, 2001

(65) Prior Publication Data

US 2002/0196506 A1 Dec. 26, 2002

(51) Int. Cl.[7] ............................................. H04B 10/00
(52) U.S. Cl. ....................... 398/129; 398/122; 398/131
(58) Field of Search ........................... 359/122, 152, 359/159; 398/121–125, 129, 131; 250/491.1

(56) References Cited

U.S. PATENT DOCUMENTS

| | | | |
|---|---|---|---|
| 4,128,309 A | 12/1978 | Lehureau et al. | 359/846 |
| 4,257,686 A | 3/1981 | Albertinetti et al. | 359/295 |
| 4,298,247 A | 11/1981 | Michelet et al. | 359/846 |
| 4,420,222 A | 12/1983 | Bret et al. | 359/846 |
| 4,588,268 A | 5/1986 | Aldrich | 359/849 |
| 4,949,056 A | 8/1990 | Akkapeddi | 359/334 |
| 5,051,571 A | * 9/1991 | Brown et al. | 250/201.9 |
| 5,204,847 A | * 4/1993 | Tayefeh | 369/13.02 |
| 5,229,889 A | * 7/1993 | Kittell | 359/849 |
| 5,233,174 A | 8/1993 | Zmek | 250/201.9 |
| 5,262,696 A | 11/1993 | Culp | 310/328 |

(List continued on next page.)

FOREIGN PATENT DOCUMENTS

| | | |
|---|---|---|
| FR | 2 389 143 | 11/1978 |
| GB | 2 247 323 A | 2/1992 |
| WO | WO 97/12267 | 4/1997 |
| WO | WO 01/52450 A2 | 7/2001 |

OTHER PUBLICATIONS

Press Release: "LightPointe Granted New Free–Space Optics (FSO) Patent, Strengthens Intellectual Property on All–Optical FSO Systems," San Diego, CA, Oct. 17, 2002, 1 page.

Graves, J. Elon et al., "First Light for Hokupa'a: 36 Element Curvature AO System at UH," Proceedings of SPIE vol. 3353, Mar. 1998, pp. 34–43.

Graves, J.E. et al., "Latest Results from the University of Hawaii Prototype Adaptive Optics System," Univ. Hawaii Laser Guide Star Adaptive Optics Workshop: Proceedings— vol. 1, Mar. 10–12, 1992, pp. 511–521.

Roddier, C. et al., "New optical testing methods developed at the University of Hawaii; results of ground–based telescopes and hubble space telescope," SPIE, vol. 1531, *Advanced Optical Manufacturing and Testing II* (1991), pp. 37–43.

(List continued on next page.)

*Primary Examiner*—Leslie Pascal
*Assistant Examiner*—Christina Y Leung
(74) *Attorney, Agent, or Firm*—Fenwick & West LLP

(57) ABSTRACT

A free-space optical data transmission system, comprised of first and second transceivers spaced a substantial distance from each other and having telescopes aimed at each other. Each transceiver has a light transmitter for transmitting data-encoded light from its telescope to the other telescope, and a light receiver for receiving the data-encoded light from the other telescope. Each transceiver has a wavefront sensor for determining the curvature of the wavefront of light transmitted between the telescopes, which light wavefront may be distorted by atmospheric aberrations, a deformable curvature mirror operably connected to the wavefront sensor and positioned in the path of the data-encoded light for modifying the wavefront curvature of the data-encoded light in response to the wavefront curvature determined by the wavefront sensor. Preferably, each transceiver has an arrangement for distinguishing/separating the transmitted and received light waves for bi-directional data transmission.

56 Claims, 11 Drawing Sheets

U.S. PATENT DOCUMENTS

| | | | | |
|---|---|---|---|---|
| 5,319,483 | A | * | 6/1994 | Krasinski et al. ............ 359/113 |
| 5,329,322 | A | | 7/1994 | Yancey ........................ 351/211 |
| 5,576,780 | A | | 11/1996 | Yancey ........................ 351/211 |
| 5,594,580 | A | | 1/1997 | Sakanaka et al. ............ 398/122 |
| 5,777,719 | A | | 7/1998 | Williams et al. ............. 351/212 |
| 5,872,644 | A | * | 2/1999 | Yamazaki et al. ........... 359/121 |
| 5,907,153 | A | | 5/1999 | Gouch ......................... 250/236 |
| 5,949,521 | A | | 9/1999 | Williams et al. ............. 351/246 |
| 5,978,121 | A | | 11/1999 | Fischer et al. ............... 398/131 |
| 6,016,212 | A | * | 1/2000 | Durant et al. ................ 359/124 |
| 6,023,057 | A | | 2/2000 | Gaffard et al. ............ 250/201.9 |
| 6,181,450 | B1 | * | 1/2001 | Dishman et al. ............. 359/124 |
| 6,239,888 | B1 | | 5/2001 | Willebrand .................. 398/129 |
| 6,384,944 | B1 | | 5/2002 | Takayama et al. ........... 398/135 |
| 6,384,952 | B1 | | 5/2002 | Clark et al. .................. 359/224 |
| 6,452,145 | B1 | | 9/2002 | Graves et al. ............ 250/201.9 |
| 6,464,364 | B2 | | 10/2002 | Graves et al. ............... 359/846 |
| 2002/0097509 | A1 | | 7/2002 | Graves et al. ............... 359/811 |

OTHER PUBLICATIONS

Roddier, Francois et al., "A Simple Low–Order Adaptive Optics System for Near–Infrared Applications," Publications of the Astronomical Society of the Pacific, vol. 103, No. 659, Jan. 1991, pp. 131–149.

Roddier, Franciois, "Astronomical adaptive optics with natural reference stars," University of Hawaii, Institute for Astronomy, 2680 Woodlawn Drive, Honolulu, Hawaii 96822, pp. 19–23.

Roddier, Francois, "Curvature sensing and compensation: a new concept in adaptive optics," *Applied Optics*, vol. 27, No. 7, Apr. 1, 1998, pp. 1223–1225.

Roddier, Francois, "Wavefront sensing and the irradiance transport equation," *Applied Optics*, vol. 29, No. 10, Apr. 1, 1990, pp. 1402–1403.

Chellabi, A. et al., "A New Control Algorithm for Bimorph Mirrors," *Systems, Man, and Cybernetics, 1995*, Intelligent Systems for the 21$^{st}$ Century. IEEE International Conference on, vol. 1 (1995), pp. 569–573.

Ribak, Erez N., "Deformable Mirrors," *Adaptive Optics for Astronomy*, D.M. Alloin and J.M. Mariotti (eds.), Kluwer Academic Publishers, Netherlands (1994), pp. 149–161.

Safronov, Andrey G., "Bimorph Piezoelectric Structures in Laser and Astronomic Adaptive Optics," *Conference on Lasers and Electro–optics*, Europe 1996 (CLEO/Europe), Tuesday/91, CtuK4.

Zhao, Hua Wei, et al., "Prototype Bimorph Mirror for the AAT Adaptive Optics System," Proceedings of *SPIE*, vol. 3126, Adaptive Optics and Applications (1997), pp. 384–390.

\* cited by examiner

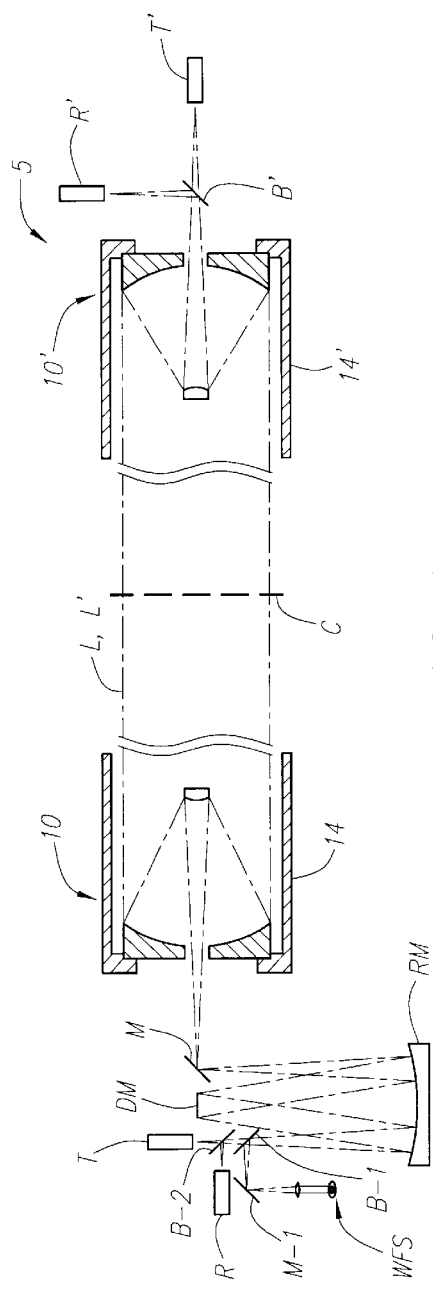
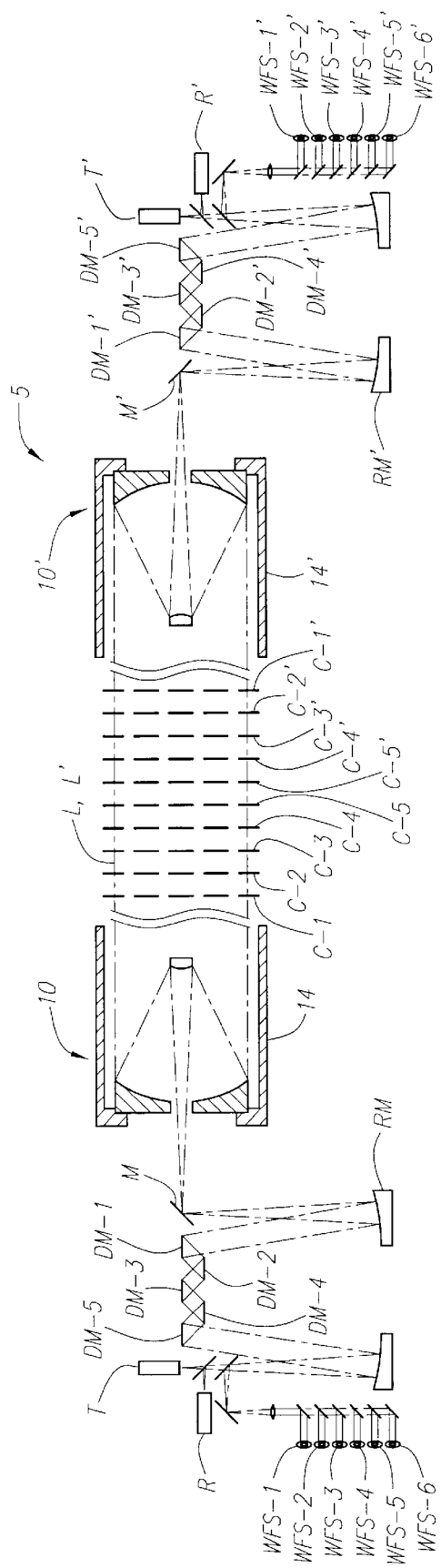
FIG. 4
FIG. 5

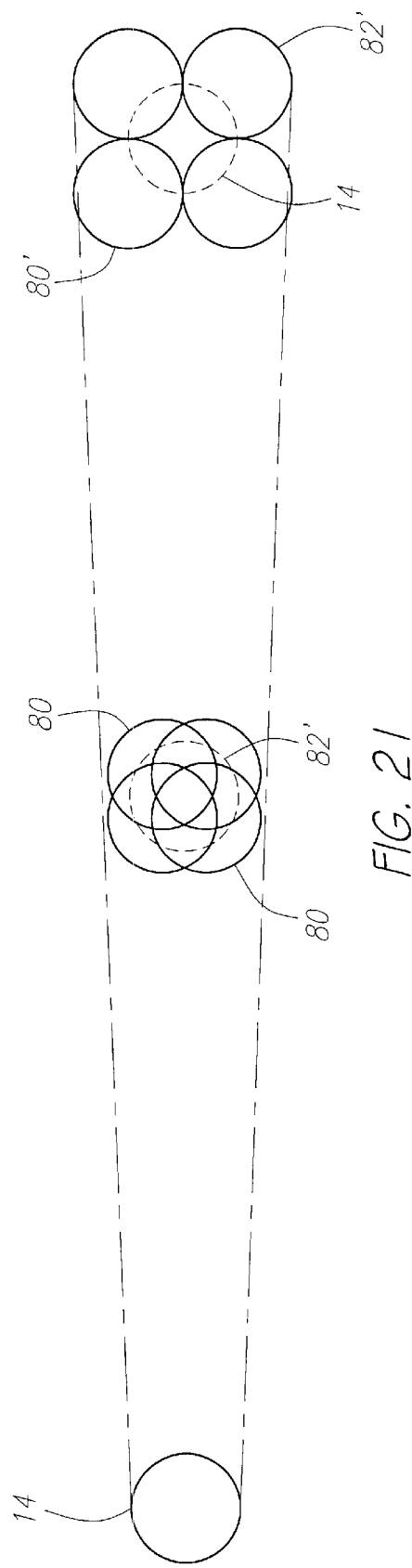

ATMOSPHERIC OPTICAL DATA TRANSMISSION SYSTEM

The present invention relates to optical data transmission system for transmitting data by light waves through the atmosphere and, in particular, to such a system in which the changing atmospheric conditions are compensated for without the loss of data transmission.

BACKGROUND OF THE INVENTION

There is a rapidly expanding need for data transmission and an infrastructure to accomplish same. While the use of fiber optics has increased the capacity and efficiency of data transmission, the expanding data transmission needs require continual additions to the fiber optics infrastructure at enormous expense and difficulty. While there have been experiments and attempts to augment the data transmission system by using light waves through the free-space of the atmosphere, the inevitable changes in atmospheric conditions have frustrated the accuracy and reliability of such atmospheric optical data transmission experiments and attempts. For example, dust, smoke, fog and rain can interfere with or block the transmission of light waves from one point to another by scattering and overall attenuation of the light beam, and other atmospheric conditions such as wind, heat waves and the like will create aberrations that are constantly changing whereby the light wavefront that is received is adversely effected to thereby impair the quality of the data transmission.

SUMMARY OF THE INVENTION

It is a principal object of the present invention to provide a novel free-space optical data transmission system that uses telescopes for transmitting and receiving the data-encoded light waves with adaptive optics systems for overcoming the aforementioned problems. A further object of this invention is to provide such an optical data transmission system with a wavefront curvature sensor and deformable curvature mirror type adaptive optics system for overcoming the atmospheric aberrations encountered in the data-encoded light wave transmitting and receiving system. A still further object of this invention is to provide such a free-space optical data transmission system using a pair of telescopes with each telescope both transmitting and receiving data-encoded light and, in addition, with means for distinguishing between the data-encoded light transmitted from and received by each of the telescopes. Another object of this invention is to provide such a free-space optical data transmission system using two telescopes spaced at a substantial distance from each other and with means for controlling the aiming of each telescope at the other telescope in response to sensing the intensity of the light received by each telescope from the other telescope.

Another principal object of this invention is to provide a bidirectional free-space optical data transmission system using a pair of transceivers spaced at a substantial distance from each other for both transmitting and receiving data-encoded light with each transceiver having an adaptive optics system for compensating for atmospheric aberrations. A more detailed object of this invention is to provide adaptive optics systems with each transceiver that compensate for aberrations in both the transmitted and the received data-encoded light. A further and important object of this invention is the use of light diffraction to isolate the operation of the pair of transceivers in the free-space optical data transmission system of this invention. Still another object of this invention is to use conjugation of the deformable mirror of the adaptive optics system to improve the performance of the optical data transmission system.

Other and more detailed objects and advantages of the present invention will appear to those skilled in the art from the following detailed description of the preferred embodiments and modifications in conjunction with the drawings.

BRIEF DESCRIPTION OF THE DRAWINGS

FIG. 4 is a diagrammatic illustration similar to FIGS. 2 and 3 of a pair of telescope transceivers but with an adaptive optics system provided with only one of the transceivers.

FIG. 5 is a diagrammatic illustration similar to FIGS. 2, 3 and 4 with the adaptive optics systems on each transceiver having a plurality of wavefront sensors and deformable mirrors for accomplishing a plurality of aberration compensations at each transceiver;

FIG. 21 is a diagrammatic illustration of the characteristics of a diverging array of data-encoded light beams for illustrating the practical limits of data transmission distance for an array of light beams from a single telescope in the free-spaced optical data transmission system of the present invention; and

DETAILED DESCRIPTION OF THE PREFERRED EMBODIMENTS

Figure 1:
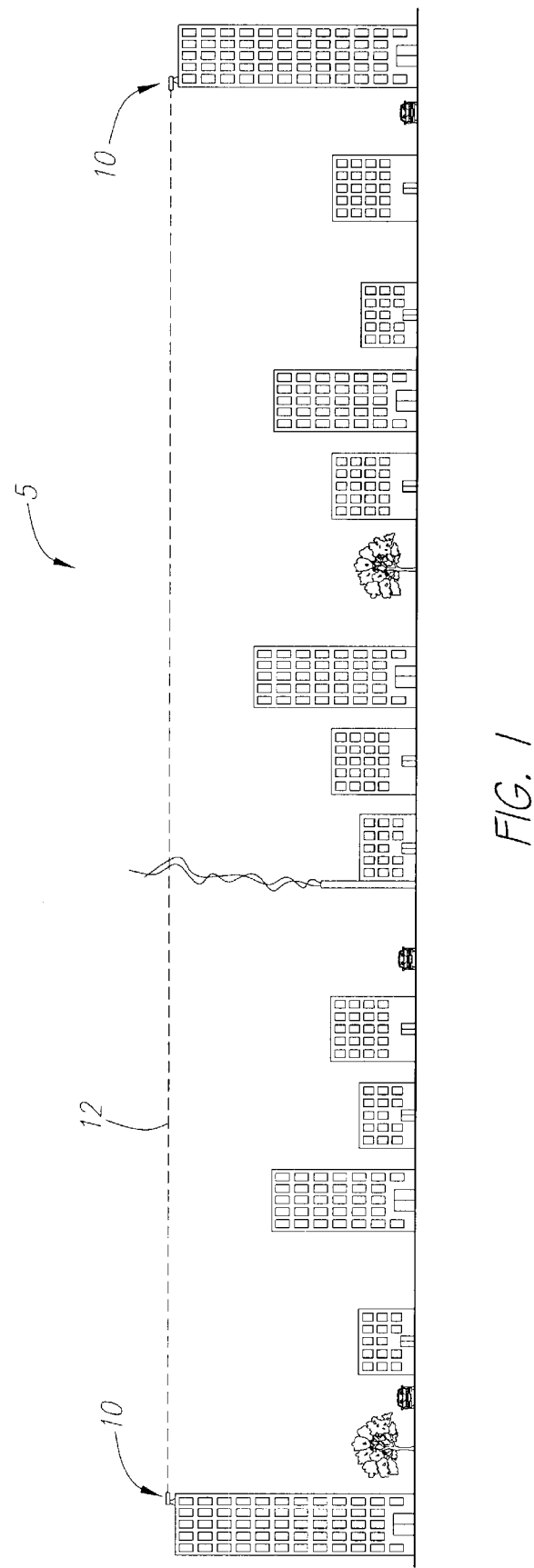
FIG. 1 is a diagrammatic elevation view of a typical installation of the free-space optical data transmission system of the present invention wherein a variety of atmospheric conditions may be created between the pair of transceivers of the system by reason of the surrounding structures and activities.

Referring now to FIG. 1, the free-space optical data transmission system S of the present invention is diagrammatically illustrated as being used in an urban environment where a pair of transceivers, generally designated 10 and 10', of the system are located on the roofs of two buildings at substantially spaced locations but having a line-of-sight 12 that is not obstructed by any permanent structures. Either or both of the transceivers 10 and 10' may be mounted in a building at a window for protection from weather conditions, as long as means are provided for cleaning and de-moisturizing the window surfaces to thereby allow an unobstructed transmission of light between the transceivers 10 and 10' along the line-of-sight 12. For example, passing a thin wiper blade over the window surface will not interfere with the data transmission and reception. FIG. 1 includes illustrations of buildings of different heights, automobiles, roadways, trees and a smoke stack on one building, which, in addition to weather conditions, create different atmospheric conditions. Rain, fog, smoke and the like lower the intensity of the transmitted light whereas conditions such as sun-induced and structure-created heat waves, air conditioning discharges, heat exchanger discharges, automobile exhaust discharges, etc. create aberrations in the line-of-sight 12 in addition to the normal atmospheric aberrations caused by weather conditions. Of course, even in a rural application of the free-space optical data transmission systems of the present invention, the atmospheric conditions in a line-of-sight 12 between the transceivers 10 and 10' will be influenced by the varying terrain, vegetation and lack of vegetation, as well as the weather conditions, thereby creating variable aberrations along the line-of-sight 12. The free-space optical data transmission systems of the present invention mitigates these atmospheric conditions that otherwise adversely affect the transmission and reception of data-encoded light waves. By using adaptive optics in the transceivers of the present invention, more available data-encoded light is available (provided) to the receiving transceiver with a good image quality. Also, by using bi-directional light transmission, the incoming beam wavefront information may be used to pre-correct the transmitted light beam by the adaptive optics of that transceiver because the bi-directional beams are on the same path.

The transceivers 10 and 10' may be identical or of different constructions for various reasons, as will appear below. It should be noted that throughout the specification and drawings the same numeral(s) and letter(s) will be used to identify identical or substantially similar components and that the components of one transceiver (10') will be identified with a prime (') symbol to distinguish its components from those of the other transceiver (10).

Before describing the embodiments of this present invention in detail, some of the features, principles and variations will be described briefly. FIG. 1 illustrates a single free-space optical data link between transceivers 10 and 10' and, for economic and physical reasons, it is preferred that the link is bi-directional with a single objective lens in each transceiver serving as both the transmitter and the receiver telescope. However, where appropriate one telescope may be used as only a transmitter and the other telescope as only a receiver, either continually or periodically, in a unidirectional system whereby each telescope will not literally be a "transceiver", i.e. bi-directional, but for convenience the term "transceiver" will be used herein to mean both bidirectional and unidirectional telescope devices of the free-space optical data transmission systems. Even for such a unidirectional system, a counter-directional probe beam will be used for the operation of the wavefront sensor, as described more fully below, whereby light is being transmitted in both directions, and preferably that probe beam will be of a different wavelength than the data-encoded light beam. In each embodiment of the system of the present invention, the light beams transmitted in opposite directions are exposed to and sample the same atmospheric conditions, whereby the wavefront data sensed at each transceiver is relevant to the data transmission. Also, it should be noted that the data-encoded light received by each of the transceivers 10 and 10' of this free-space data link may be processed or retransmitted in any convenient and conventional manner, such as, through fiber optics or another free-space data link of this or any other type.

In the bi-directional free-space optical data transmission system of the present invention, at present it is preferred to use light of 1.55 $\mu$m (microns) wavelength for both the data-encoded light transmission and wavefront sensing, as described below, although different wavelengths may be used for data and wavefront sensing, and other wavelengths may be used and even preferred under certain atmospheric conditions. For instance, the 1.31 $\mu$m wavelength may perform well with the present system in a single wavelength or in WDM (wave division multiplexing) mode, but may present problems in a WDM mode due to the number of atmospheric (OH) absorption features. Further, the present commercial unavailability of amplifiers for 1.31 $\mu$m at a reasonable cost renders that wavelength less attractive.

While the use of a single pair of transceivers 10 and 10' normally will be used for a free-space data link of the present system for reasonable distances, i.e. 1 km to 2 km and perhaps beyond, it is also possible and within the scope of the present invention for significantly longer distances to use an arrangement of two or more free-space optical data transmission systems operating side-by-side to increase the reliability and, with such an arrangement, it is preferred that the output apertures of the transceivers be placed close together and that the phase of the data signals transmitted be maintained. In the case of using one or more adjacent apertures, the apertures should be close enough together that the images in the receiver telescopes should sufficiently overlay so that significant energy from each telescope can be coupled to a single fiber. Alternatively the links can, for example, be placed far enough apart that there is no interaction between them (separation of a few arc-minutes or greater with the preferred embodiments) so that they can be operated completely independently. In the case where the transmitter telescopes are placed closely together sufficient attention must be paid to the transmitter telescopes optical coherence to ensure that problems are not encountered due to spatial or temporal interference. Data modulation signals from each of the transmitting telescopes should be in phase. However, it is important that the optical phase from each telescope should either be controlled to much better than a wavelength or be randomized to prevent interference effects at the receiver. The path length can be controlled actively, but requires a second wavefront sensor to determine the relative path length delays, or piston errors that occur between the disparate apertures. Interferometric piston sensors are well known in the art and can be based on fringe tracking or a simple two arm interferometer. Optical phase randomization can be achieved using the same laser light, split to feed each telescope (possibly coherently amplified), provided that dissimilar path delays greater than the optical coherence length are introduced in each telescope, and provided such delays are consistent with maintaining a sufficiently consistent data signal phase relationship. Optical phase randomization may also be achieved by using a separate transmitter diode or laser diode for each telescope, which also implies the use of optical-electrical-optical (OEO) conversion or an incoherent optical amplifier (optical transistor) to transfer the signal. In a similar way, careful attention must be paid to coherence issues if optical signals from several independent receiver telescopes are to be optically combined. The same solutions of controlling the piston errors, or ensuing the signal are incoherently combined can also be applied to the receiver context. Whenever optical beams from separate sources are combined the optical bandwidth of the transmitter sources must be much greater than the bandwidth of the data signal, to prevent unwanted temporal interference from adding excess noise to the combined signal.

Presently, it is contemplated that the most desirable light sources for transmitting the data-encoded light by the system of the present invention is directly from an optical fiber. This may be a laser diode of any type which is bright enough and can be modulated at fiber transmission speeds. If the data signal is electrical, then an electrical-optical (EO) conversion will be made. If the data signal is optical but of a wavelength that is incompatible with the present system, then an optical-electrical-optical (OEO) conversion will be made, such as from 1.31 $\mu$m wavelength to 1.55 $\mu$m wavelength for the present free-space transmission system.

The minimum size of the light beam propagated between two systems is set by diffraction. Assuming that the projected beam has a Gaussian profile of standard deviation $\sigma$ (sigma) and is projected a distance D, then the standard deviation of the projected beam due to diffraction is $D\lambda/\pi\sigma$ where $\lambda$ is the propagation wavelength. A characteristic propagation distance, which depends on $\sigma$ the width of the projected beam (which will be a fraction of about ⅓ to ¼ of the objective lens diameter) can be defined. At and beyond the characteristic propagation distance, phase information from the projecting/transmitting telescope is converted to pure amplitude variations at the receiving telescope. The characteristic distance may be defined (somewhat arbitrarily) as the distance where $D\lambda/\pi\sigma=\sigma$, that is where the beam diameter has expanded by a factor of the square root of 2, then $D=\pi\sigma^2/\lambda$. Therefore, for example, with a 12.5 cm diameter telescope lens with a projected $\sigma$ (sigma) of 4 cm, then the characteristic range would be approx. 3 Km. Beyond the characteristic range the data signal strength will fall as the square of the distance. For ranges less than the characteristic range, there will be increasing propagation of wavefront phase information between the two systems. At some point this propagation of phase information will cause instability in the two opposing adaptive optics systems. However, geometric arguments would indicate that instability should not be a serious problem as long as $1>>\sigma$. For distances significantly less than the characteristic distance, some differential focus between the transmit and receive fibers may be necessary in order to ensure that the aperture of the receiving telescope is not significantly under filled. Also at these shorter distances pupil illumination may become non-uniform due to Fresnel diffraction, and adjusting the transmit beam focus may also improve the pupil illumination in this case.

Figure 6:
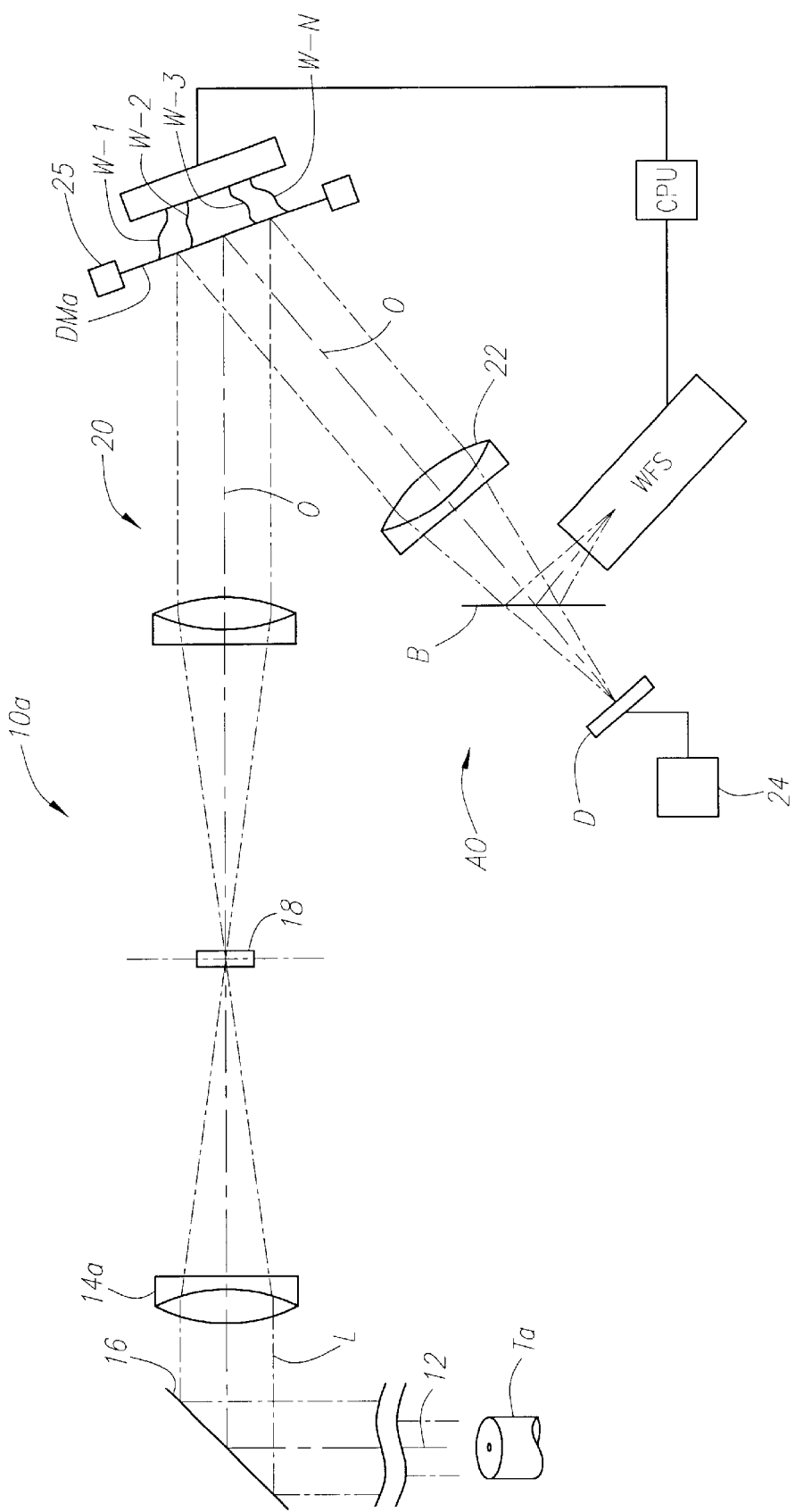
FIG. 6 is a diagrammatic illustration of the optical system of a transceiver of the free-space optical data transmission system of the present invention.
Figure 7:
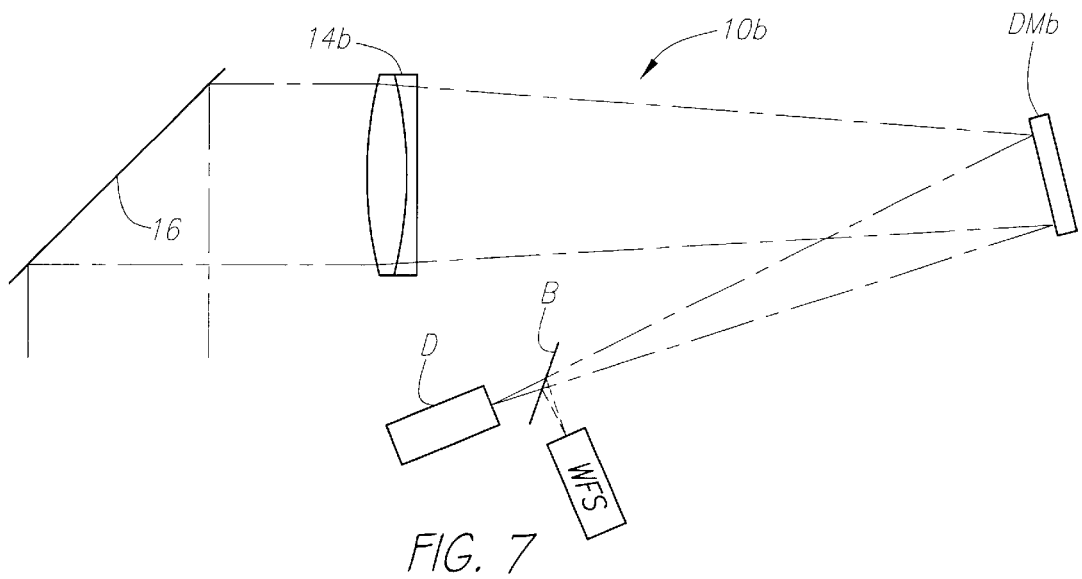
FIG. 7 is an optical diagram of another embodiment of the optical system of a transceiver of the free-space optical data transmission system of the present invention.
Figure 8:
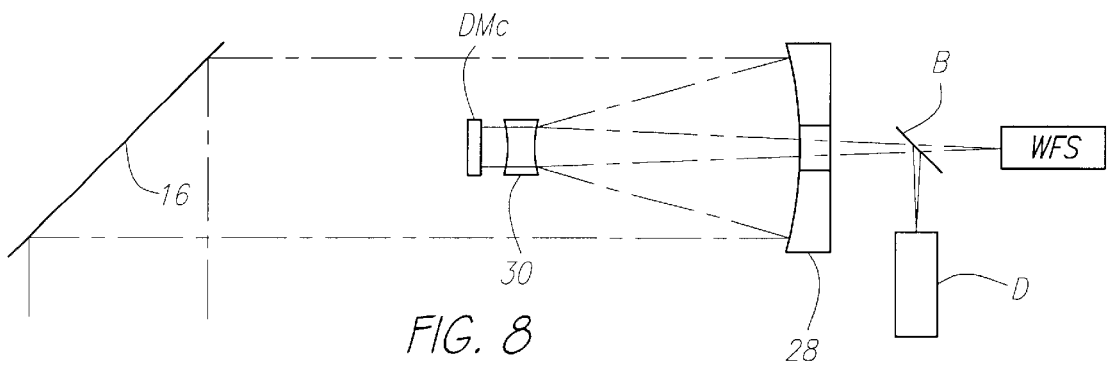
FIG. 8 is a diagrammatic illustration of still another embodiment of the optical system of a transceiver of the free-space optical data transmission system of the present invention.

Referring now to FIGS. 2–5, four embodiments are illustrated of typical basic arrangements and components of the transceivers 10 and 10' but it is to be understood and will readily appear to those skilled in the art that various modifications and combinations of those representative systems may be used for particular applications or other reasons. Each transceiver 10, 10' is illustrated in the Figures as including a reflecting type telescope 14, 14' but it also is to be understood and will readily appear to those skilled in the art that other types of telescopes may be used, for example, as shown in FIGS. 6, 7 and 8. Each free-space optical data transmission system S of the present invention includes at least one adaptive optics system, as part of the transceiver 10 and/or 10'. While any form of adaptive optics system having a wavefront sensor that is insensitive to light intensity variations across the pupil may be used in the data transmission system S to compensate for the aberrations in the light waves caused by the atmosphere, it is preferred to use a system having a differential, self-calibrating, curvature wavefront sensor and a deformable curvature mirror for modifying the sensed wavefront. Some examples of preferred wavefront sensors and their operation are described in U.S. patent application Ser. No. 09/579,786, filed May 26, 2000, and issued on Sep. 17, 2002 as U.S. Pat. No. 6,452,145, entitled "Method And Apparatus For Wavefront Sensing", having the same inventors as herein, which disclosure is incorporated herein by reference as though set forth in full. Examples of preferred deformable curvature mirrors are disclosed in U.S. patent application Ser. No. 09/769,988, filed Jan. 25, 2001, and issued on Oct. 15, 2002 as U.S. Pat. No. 6,464,364, entitled "Deformable Curvature Mirror", also having the same inventors as herein, which disclosure is incorporated herein by reference as though set forth in full.

Figure 2:
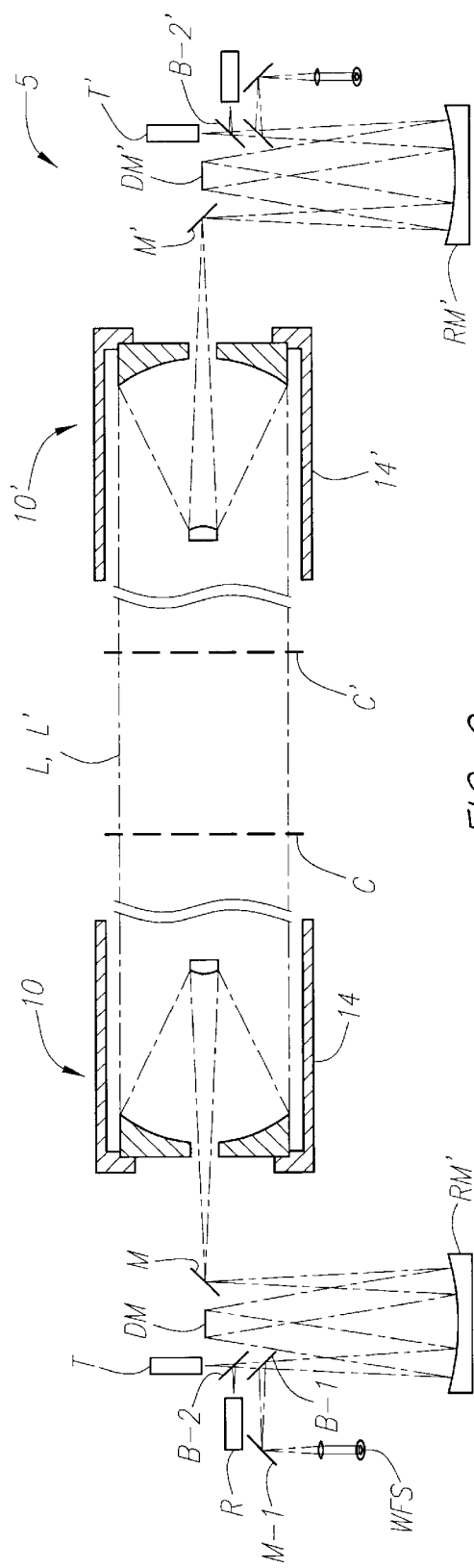
FIG. 2 is a diagrammatic illustration of a pair of telescope transceivers in a preferred embodiment of a free-space optical data transmission system of the present invention, with an adaptive optics system provided with each transceiver for compensating for light aberrations in both the transmitted and the received light waves.

Referring more specifically to FIG. 2, a preferred embodiment of the free-space optical data transmission system S of the present invention is illustrated in which an adaptive optics system is provided on each of the transceivers 10 and 10'. Each adaptive optics system includes a single wavefront sensor WFS, WFS' and a single deformable mirror DM, DM' for sensing and compensating for aberrations in the light waves L', L, respectively, transmitted by the associated telescope 14', 14, respectively. The light waves L, L' sensed by the respective wavefront sensors may be the same light waves that are encoded with the data being transmitted or separate light waves, as discussed more fully below, but for convenience of description at this point it will be assumed that the light waves that are being received and sensed by the respective wavefront sensors are the same as the data-encoded light waves. Each transceiver 10, 10' is provided with a light wave transmitter T, T' of any convenient type, such as, a fiber optic light wave source, for transmitting data-encoded light into the associated telescope 14; 14' and a receiver R, R' for receiving the data-encoded light from the associated telescope in a bidirectional transmission arrangement. For clarity and simplicity, the data transmission in only one direction, i.e. from transceiver 10' to transceiver 10 (right to left in FIG. 2) will be described first but it will be understood that data-encoded light is also being transmitted simultaneously in the opposite direction, i.e. left to right. In this embodiment the light L' first is transmitted through beamsplitters B-2' and B-1', for reasons that will appear later, to a relay mirror RM' where the light is conjugated to a deformable DM' and back to relay mirror RM' and then to mirror M which directs the light L' to telescope 14' that transmits the light to telescope 14. The light waves L' received by telescope 14 of transceiver 10 are transferred to a mirror M from which the light waves are directed to a relay mirror RM which may be in the form of a parabolic mirror. The specific optical functions and relevance of mirrors M, M', deformable mirrors DM, DM' and relay mirrors RM, RM' will be described below. The incoming light waves are then directed to and reflected from the deformable mirror DM back to the relay mirror RM from which the light waves are directed to two beamsplitters B-1 and B-2 positioned in series to reflect a portion of the light and transmit therethrough the remaining portion of the light reaching that beamsplitter in a conventional manner. The light waves reflected by the first beamsplitter B-1 are directed to the wavefront sensor WFS either directly or indirectly from another mirror M-1 as shown in FIG. 2. The initial transmission of light waves L' from transceiver 10' that reach the wavefront sensor WFS normally will have aberrations caused by the atmospheric conditions between the transceivers 10 and 10' which will be sensed and identified by the wavefront sensor WFS, as disclosed more fully in the aforementioned U.S. patent application Ser. No. 091579, 786. In turn, the wavefront sensor WFS will control the shape of the deformable mirror DM to compensate for the aberrations in the wavefront of the light waves L', whereupon the wavefront sensor WFS will then sense a compensated wavefront as corrected by the deformable mirror DM with the aberrations eliminated or virtually so. Thus, the portion of the light waves L' passing through the beamsplitter B-1 are also corrected and a portion thereof will be reflected by the beamsplitter B-2 to a light wave receiver R of the transceiver 10 as the data-encoded light in virtually the same form that was transmitted by the transmitter T' of the transceiver 10'. As the atmospheric conditions along the line-of-sight 12 (see FIG. 1) change, as described above, they create new or different aberrations in the light waves L' and this change in condition will be sensed by the wavefront sensor WFS for in turn modifying the deformation of the deformable mirror DM to compensate for the changed aberrations whereby the light receiver R continually receives corrected light waves as a result of the operation of the adaptive optics system comprising the wavefront sensor WFS and the deformable mirror DM.

As noted at the outset and thus far described, the free-space optical data transmission system S of FIG. 2 is transmitting data-encoded light in only one direction (right to left in FIG. 2) wherein the transceiver 10 functions to receive and correct light waves L' that are transmitted by the transceiver 10'. The system S also serves to transmit and receive data-encoded light L in the opposite direction (left to right) by using the identical or similar components to provide a bi-directional data transmission system. However, since the wavefront sensor WFS is continually sensing the wavefront of the light L' that is being received by transceiver 10 and correcting that wavefront by controlling the deformable mirror DM, the light waves L transmitted by transmitter T that are also reflected off the deformable mirror DM will be modified, in advance, to compensate for the aberrations in the wavefront that will be created by the atmospheric conditions between the transceivers 10 and 10'. Thus, the wavefronts actually are partially compensated for by each deformable mirror DM, DM' prior to being transmitted by the coupled telescope 14, 14' and then additionally compensated by the other deformable mirror DM', DM of the receiving transceiver 10', 10, respectively. The bi-directional light transmissions pass through the same atmosphere in the line-of-sight 12 and therefore the wavefront sensors WFS, WFS' are continually sampling the same atmospheric conditions and aberrations. Further, it is possible for the wavefront sensors WFS and WFS' to share data for wavefront compensation by transmitting that data with the other data-encoded light. Generally, atmospheric conditions that are closer to the telescope receiving the light waves have a greater influence on the phase of the incoming wavefront than atmospheric conditions closer to the source of the light waves. On the other hand, atmospheric conditions closer to the transmitting telescope will mainly effect the amplitude in the receiving telescope and the direction of the transmitted light beam. Gross steering or misdirection of the light beam by aberrations near the transmitting telescope can cause the beam to miss the receiving telescope. Higher order aberrations will have a more complex effect on the beam profile, but will similarly modulate intensity.

In order to more effectively compensate for the atmospheric conditions and aberrations, the proper deformable mirror conjugation is used by the present invention. The amount of conjugation adjustment that is available is restricted by diffraction effects. Since conjugation is achieved by re-imaging a location in the beam path onto the deformable mirror DM, DM', the resolution of the imaging system (that is the telescopes 14, 14') must be sufficient to resolve the individual actuators (described below and shown in FIGS. 10 and 11) of the deformable mirror at the conjugate distance, although the image may be somewhat fuzzy. It is preferred that the beam size is chosen so that the receiver telescope is in the caustic zone of the transmitter telescope, which would place the maximum range of conjugation at approximately ⅓ of the link distance for a 19 actuator system (see FIG. 12). The range of conjugation may be increased by increasing the size of the telescopes, which is an option that could become particularly attractive when using an array of transmitter/receivers in the focal plane, although this increases the cost as well. When using multiple transmitter/receiver sources, the use of multi-conjugate adaptive optics can also improve the field of view of the correction, allowing for better overall throughput. The optical system must maintain an accurate conjugation of the deformable mirror to the wavefront sensor, and accurately maintain registration of the center of the membrane mirror (described below, or with the wavefront reference position) and the input and output optical fibers.

Returning now to the application of the proper conjugation to the embodiment of FIG. 2, nominally the deformable mirror conjugation C of deformable mirror DM would be located about one-third of the distance from the transceivers 10 to the transceiver 10' to provide an average location for the aberration corrections and, similarly, the conjugation C' would be one-third of the distance from transceiver 10' to transceiver 10. However, if it is determined that the maximum aberrations consistently occur at a different location along the line-of-sight 12, such as, above an industrial plant or large asphalt parking lot, one of the deformable mirror conjugations C or C' may be moved to that location of maximum aberrations by any appropriate optical means to thereby maximize the effectiveness of the wavefront correction. One such optical means is a tunable deformable mirror in the position of mirrors M, such as a deformable mirror of the type described below with respect to FIGS. 12 and 13 but with only a single electrode segment actuator. Specifically, by appropriately tuning the mirror M a location for the deformable mirror conjugation C of transceiver 10 may be selected and by tuning the mirror M' a deformable mirror conjugation C' of the transceiver 10' may be selected, which locations normally will be closer to the respective associated telescopes 14, 14' and/or a location of maximum aberrations.

By the optical data transmission system S of the present invention using adaptive optics and proper beam sizing, the light reflected from each segment of the deformable mirror DM, DM' fills the entire receiving telescope 14', 14, respectively.

Figure 3:
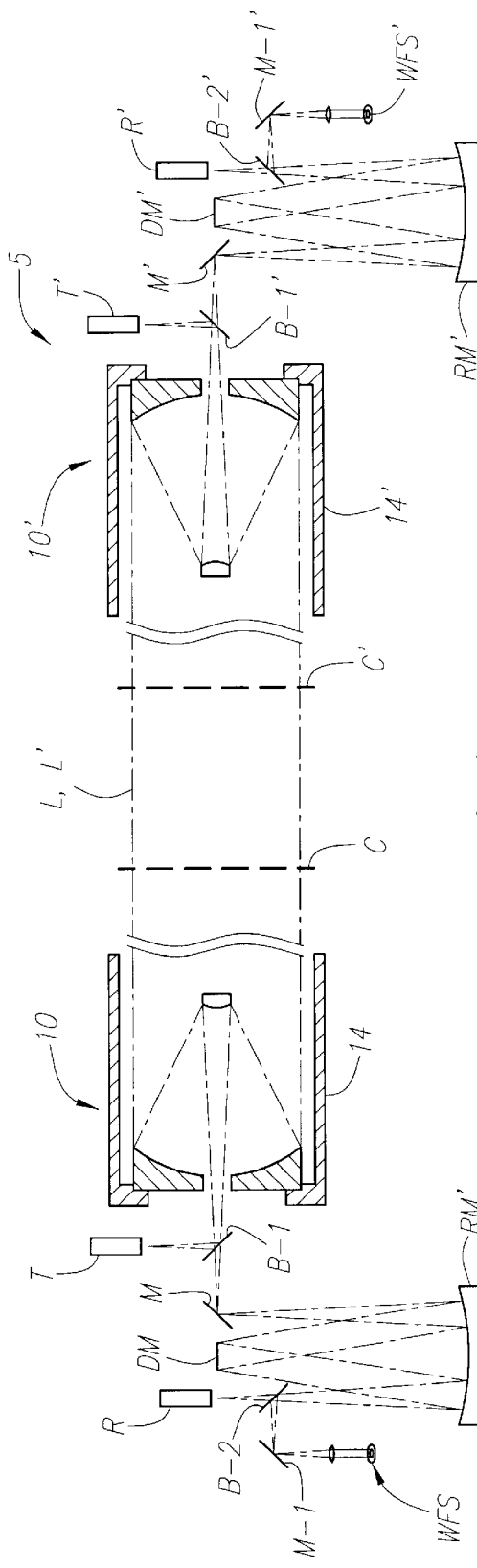
FIG. 3 is a diagrammatic illustration similar to FIG. 2 of a pair of telescope transceivers with a modified form of the adaptive optics system provided with each transceiver.

Referring now to FIG. 3, this embodiment of the free-space optical data transmission system S again is provided with a pair of transceivers 10 and 10' with telescopes 14 and 14', respectively, as described with respect to FIG. 2, but the arrangement of the light wave transmitting, light wave receiving and adaptive optics systems for each of the transceivers is somewhat different than in the embodiment of FIG. 2, although the basic process and functions remain the same. Again, the transceivers 10 and 10' are identical and each is provided with a transmitter T, T', a receiver R, R' and an adaptive optics system having a wavefront sensor WFS, WFS' and a deformable mirror DM, DM'. The data-encoded light waves are transmitted by each transmitter T, T' and reflected from a first beamsplitter B-1, B-1' directly into the telescope 14, 14' for transmitting the light waves, L, L' to the other telescope without first being reflected off a deformable mirror as in FIG. 2. The light waves received by each telescope 14, 14' pass through the first beamsplitter B-1, B-1' to a mirror M, M' where the light rays are reflected to the relay mirror RM, RM', then to the deformable mirror DM, DM', back to the relay mirror RM, RM', then to a second beamsplitter B-2, B-2' where a portion of the light passes through the beamsplitter to a receiver R, R' and the remaining portion of the light is reflected to the wavefront sensor WFS, WFS' either directly or indirectly from a mirror M-1, M-1'. In this embodiment, only the incoming light waves are corrected by the adaptive optics system of that transceiver 10, 10' because the transmitted light waves from each transmitter T, T' are reflected directly into the associated telescope 14, 14' by the first beamsplitter B-1, B-1', rather than being corrected in advance as were the light waves from each transmitter T, T' in transceivers 10, 10' in the embodiment of FIG. 2. This embodiment of FIG. 3 has the advantage of adaptive optics systems in each transceiver for independently and separately correcting the wavefront of the incoming light waves, which simplifies the system but it cannot assist in correcting the outgoing light waves. If desired, the locations of the transmitters T, T' and receivers R, R' in each transceiver may be reversed so that the light being transmitted is corrected by the deformable mirror DM, DM' before being transmitted, based on the light L', L received by the associated wavefront sensor WFS, WFS'.

Referring now to FIG. 4, the free-space optical data transmission system S has only a single adaptive optics system (wavefront sensor WFS and deformable mirror DM) on the left-hand transceiver 10, although it is the same or substantially similar to the adaptive optics system provided with the transceiver 10 of FIG. 2. While this embodiment of FIG. 4 may be used for bidirectional data transmission, it is not as well suited to do so as the embodiments of FIGS. 2 and 3 but rather is more appropriate for unidirectional data transmission, such as from a transceiver 10 on the ground to a transceiver 10' in a satellite. The transceiver 10' has a transmitter T' for transmitting a probe beam of light L' that preferably is of a different wavelength than the data-encoded light L for readily distinguishing therebetween. The wavefront sensor WFS responds to the light L' for compensating for aberrations by controlling the deformable mirror DM to correct, in advance, the data-encoded light L being transmitted by transmitter T through telescope 14 to telescope 14' where it is received by receiver R'. With this arrangement the receiver R' may be a simple optical fiber for detecting the light intensity. Again, it is preferred that the mirror M of transceiver 10 be conjugationable for establishing the most desirable location of the deformable mirror conjugation C. If the data transmission system S of FIG. 4 is used between earth and a satellite with a transceiver 10' on the satellite, all of the aberrations will occur in the atmosphere nearer the earth-bound transceiver 10 and theretofore the conjugation C would be located close to transceiver 10.

Referring now to FIG. 5, another embodiment of the free-space optical data transmission system S of the present invention is illustrated and representative of the complexity and refinement that may be incorporated in the system. The embodiment of FIG. 5 is similar to the embodiment of FIG. 2 in that each transceiver 10, 10' has both the transmitter T, T' and the receiver R, R' in the location for the adaptive optics system to correct both the transmitted and received light waves. Here, the adaptive optics system in each transceiver 10, 10' is provided with a plurality of wavefront sensors (for example, six, WFS-1 through WFS-6 and WFS-1' through WFS-6') and a plurality of deformable mirrors (for example, five, DM-1 through DM-5, DM-1' through DM-5') which may be of any number appropriate for the particular use of the data transmission system S. The number of wavefront sensors in each transceiver should not normally be less than the number of deformable mirrors for controlling the deformable mirrors because of implementation problems, but there may be more wavefront sensors than deformable mirrors, as shown, for additional wavefront sensing and sharing of data. Each deformable mirror is matched to a wavefront sensor in that transceiver such as deformable mirror DM-1 being matched to wavefront sensor WFS-1 in transceiver 10, and successively the deformable mirrors DM are matched to the wavefront sensors WFS in the same order in which they receive the light waves, i.e. the deformable mirrors DM-1 through DM-5 from right to left are matched to the wavefront sensors WFS-1 through WFS-5 from top toward the bottom of transceiver 10 as viewed in FIG. 5. The sixth wavefront sensor WFS-6, WFS-6' shares data with one or more of the other wavefront sensors. The conjugate tunable mirror M establishes the deformable mirror conjugations C-1 through C-5 for the deformable mirrors DM-1 through DM-5, respectively, and the conjugate mirror M' establishes the conjugate relationship for the deformable mirrors D-1' through DM-5' of the transceiver 10'. The plural deformable mirrors DM in each transceiver may be positioned at different distances from each other, which places them at different distances from the conjugate mirror M, M' to thereby change the spacing between the conjugates. For example, if the spacing between the first two deformable mirrors DM-1 and DM-2 is twice as large as the spacing between each pair of the remaining deformable mirrors DM-2 through DM-5, then the spacing between the first two conjugates C-1 through C-2 will be twice as large as the spacing between successive conjugates C-2 through C-5. Moreover, while the conjugates C-1 through C-5 for transceiver 10 have all been illustrated in FIG. 5 as being to the left of the conjugates C-1' through C-5' of transceiver 10' for simplicity, it is to be understood and will readily appear to those skilled in the art that the conjugates for each transceiver may overlap the conjugates of the other transceiver. Further, while each deformable mirror is nominally matched to a specific wavefront sensor, it should be understood and will appear to those skilled in the art that the wavefront data from each wavefront sensor may be shared with wavefront data from the other wavefront sensors in the same or the other transceiver for optimizing the wavefront correction. Only a portion of the total wavefront correction is accomplished by each deformable mirror. The deformable mirrors may be provided with the different numbers and patterns of electrode actuators (see FIGS. 12 and 13 and description below) for improving aberration compensation and, in general the deformable mirrors that are conjugated to distances closer to the transceiver in which they are mounted will be provided with more electrode actuators for more precise control. Also, it should be noted that the relay mirrors RM, RM' in FIG. 5 are each comprised of two separate components and could comprise additional components if a different arrangement of the deformable mirrors is desired.

FIG. 6 diagrammatically illustrates a typical transceiver 10a with more detail concerning the telescope aiming and the adaptive optics system OA than illustrated in FIGS. 2–5. The telescope 14a is diagrammatically illustrated as a lens that receives the light waves L from a tip-tilt mirror 16 (which may be the same or in addition to aforedescribed mirrors M, M') that receives light from a transmitter Ta along the line-of-sight 12 of a free-space optical data transmission system of the present invention. In this embodiment, the telescope is intended to be positioned vertically (in spite of its orientation in FIG. 6 for convenience of illustration), unlike the illustrations in FIGS. 1–5, and the tip-tilt mirror 16 is capable of being pivoted about two perpendicular axes, one on the vertical axis of the telescope like a turret and the other horizontal in the plane of the mirror, to cause "tip" and "tilt" adjustments for aiming the mirror directly along the line-of-sight 12. As an alternative, the telescope 14a may be rotatable on its axis coincident with a vertical axis, either as a separate unit or with the entire transceiver 10a, for generally aiming the mirror 16 along the line-of-sight 12, whereby the vehicle axis of pivoting of mirror 16 may be eliminated. Still another alternative arrangements may be used for the course pointing or aiming of the telescopes, such as using other tip-tilt mirrors or the deformable mirror or translate the objective lens by small amounts. By this arrangement of the tip-tilt mirror 16 and/or rotation of the telescope about its own axis and/or other means, the transceiver 10a may be accurately aimed along the line-of-sight 12 toward the other transceiver of this data transmission system without requiring adjustable movement of the entire transceiver 10a in all three perpendicular axes. The light waves from the telescope 14a are focused on a deformable mirror conjugate tuning element 18 which is diagrammatically illustrated and may comprise the single element deformable mirror M, M' described with respect to FIGS. 2–5. The light rays then proceed through an AO relay 20, which may correspond to the relay mirror RM, RM' shown in FIGS. 2–5, to the deformable mirror DMa, which advantageously here is depicted as a deformable curvature mirror of the type disclosed in the aforementioned U.S. patent application Ser. No. 09/769,988. The light is reflected from the deformable mirror DMa to a lens 22 that refocuses the image on the plane of an image detector D, which may correspond to the aforedescribed receivers R, R'. The image detector D may be of any convenient type that is suitable for the particular application of the free-space optical data transmission system of the present invention, such as an optical fiber for further transmission of the data-encoded light or any other appropriate detector for the desired use of the light, such as, a video camera, a custom format of a charged couple device, a single PIN diode, an array of PIN diodes, a photon counting detector or the like. The light or data may then be conducted or transmitted to any appropriate device 24 for further use. When the deformable mirror DMa is not active and working in closeloop with the wavefront sensor, as described below, the image or light wavefront received by the image detector D will be the uncorrected image received by the telescope 14a. When the deformable mirror DMa is appropriately deformed to compensate for the aberrations, the light waves received at the image detector D will be diffraction limited, i.e. a wavefront corrected for aberrations in the light waves L transmitted to the transceiver 10a. Conversely, when the transceiver 10a is used for transmitting data-encoded light rays, the transmitting means, such as an optic fiber positioned at the location of detector D will transmit light to the deformable mirror DMa and through the telescope 14a to another transceiver as described with respect to FIGS. 2–5. In transceiver 10a, a wavefront sensor WFS receives a portion of the light directed towards the detector D by reason of a beamsplitter B, which light is corrected or uncorrected depending on whether the deformable mirror is activated or not, respectively, and the data is communicated to a central processing unit CPU for processing by data reduction software to derive the wavefront curvature in the preferred embodiment and provide the data appropriate for operation of the deformable mirror DMa. Specifically, as is well known in the art, the wavefront is derived or recovered by solving the Poisson equation with respect to the intensities of the Dirichlet's boundary conditions relative to the shape of the extrafocal images detected by the wavefront sensor WFS in the preferred embodiment, as described in the aforementioned U.S. patent applications Ser. Nos. 09/579,786 and 09/769,988. The CPU then provides a plurality of separate and controlled high voltage electrical potentials to a plurality of separate conductive electrode segments (described below with respect to FIGS. 12 and 13) on the back of the deformable mirror DMa through a like plurality of wires W-1, WLA-2, W-3 through W-N. The deformable mirror DMa is fixedly mounted in a mount 25 and the overall slope of the mirror, i.e. the angle of reflection of the optical axis O, can be modified by the application of high voltages to selected electrode segments and the curvature of the surface of the deformable mirror DMa may be modified for correcting aberrations by the application of controlled high voltages to other electrode segments through other wires, whereby the wavefront curvature may be corrected and so detected by the wavefront sensor WFS.

FIG. 7 diagrammatically illustrates another embodiment of a transceiver 10b that uses a slightly different optical arrangement. Transceiver 10b is also provided with a tip-tilt mirror 16 performing the same functions and a telescope 14b but the telescope transfers the light waves L directly to the deformable mirror DMb from which the light rays are reflected to the beamsplitter B for dividing the light waves between the detector D (or receiver R) and the wavefront sensor WFS.

FIG. 8 illustrates still another embodiment a transceiver 10c having a different telescope and adaptive optics arrangement which again uses a steering tip-tilt mirror 16 to direct the light rays to a primary mirror 28 that reflects the light rays to a lens 30 that directs the light rays to a deformable mirror DMc. The light rays are then directed to the beamsplitter B for dividing between the detector D and wavefront sensor WFS. This telescope embodiment is similar to a Cass. type except that the secondary is comprised of two optical elements instead of a simple convex mirror. By using a refractive element in double pass right in front of the deformable mirror DMc, the deformable mirror may be of a much simpler flat shape rather than curved.

Figure 9:
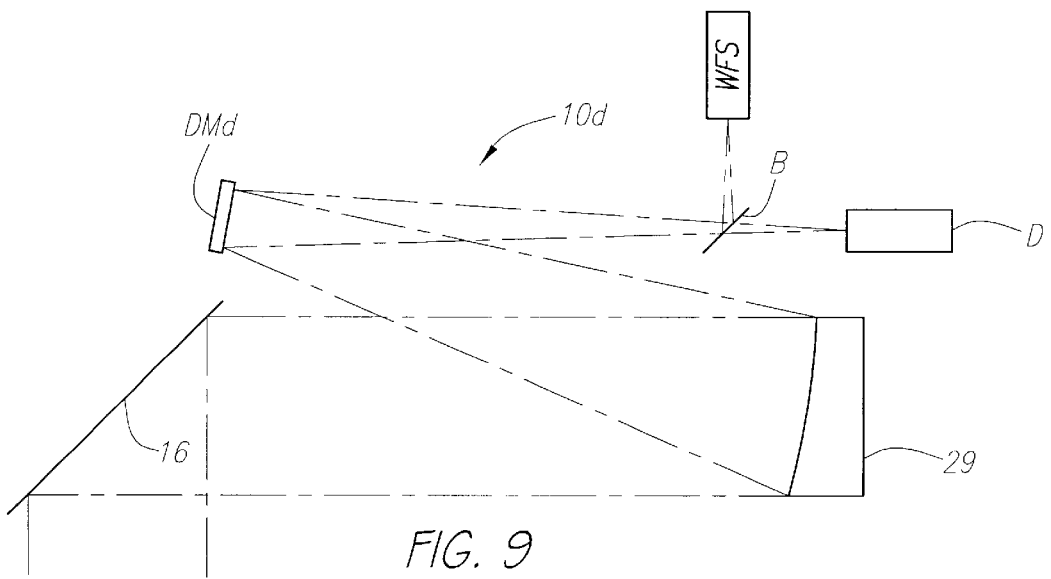
FIG. 9 is a diagrammatic illustration of still another embodiment of the optical system of a transceiver of the free-space optical data transmission system of the present invention.

FIG. 9 illustrates a still further embodiment of a transceiver 10d having a still different telescope and adaptive optics arrangement. A tip-tilt mirror 16 directs the light rays to a parabolic mirror 29 which reflects and directs the light rays to a deformable mirror DMd which in turn reflects the light rays to a beamsplitter for dividing the light rays between a detector D and a wavefront sensor WFS. This off-axis reflecting type of telescope may have advantages for certain applications.

As noted above, in each of the four telescope/AO systems of FIGS. 6, 7, 8 and 9, at the location of the detector D there may be provided either a receiver R or a transmitter T of the systems S disclosed in FIGS. 2–5 or, as shown in those Figures, one or more additional beamsplitters may be provided for accommodating additional receivers and/or transmitters. Also, the location of the requisite detector (not shown) in the wavefront sensor WFS also may serve as the same location for the detector D, a receiver R and/or a transmitter T.

Figure 10:
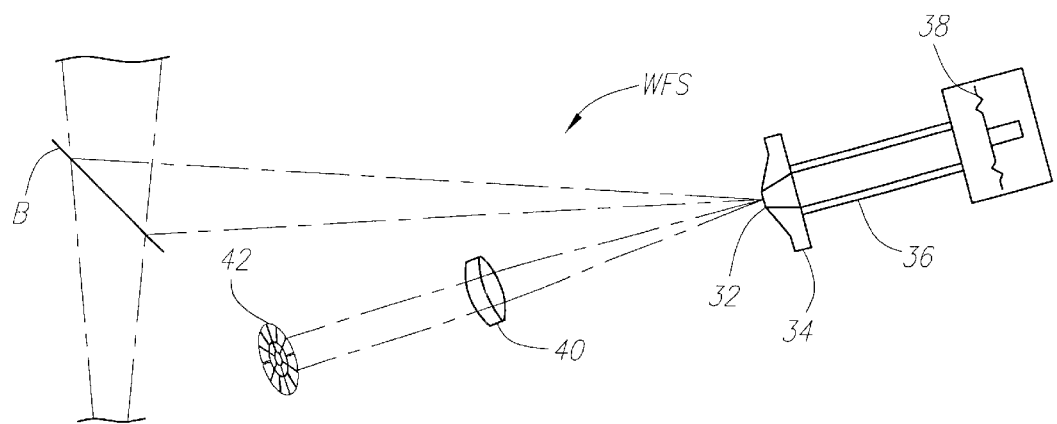
FIG. 10 is a diagrammatic illustration of the optical system of a typical wavefront sensor for use in the transceivers of the free-space optical data transmission system of the present invention.

By way of illustration without limitation, a typical wavefront sensor WFS that may be used in the foregoing embodiments of the present invention is diagrammatically illustrated in FIG. 10. The light rays from the beamsplitter B are focused on a membrane mirror 32 mounted on a mount 34 that is connected to a tuned cavity device 36 which in turn is connected to an acoustic driver 38 for acoustically driving the membrane mirror at a high rate of vibration, such as, but not limited to, 4.0 kHz. It is contemplated that it may be advantageous to vibrate the mirror 32 at a rate as high as 25 kHz or more. The light rays reflected from the membrane mirror 32 pass through a collimating lens 40 to the wavefront sensor detector 42. When the membrane mirror 32 is not activated to a vibrating state, that is when the membrane mirror 32 is flat, the image of the deformable mirror is optically in focus on the detector 42. However, when the membrane mirror 32 is vibrated, it flexes between concave and convex conditions whereby the image is alternately defocused, positively and negatively, on the detector 42 which data is communicated to the CPU (see FIG. 6) for determining the curvature of the light wavefront in the aforedescribed manner.

Figure 11:
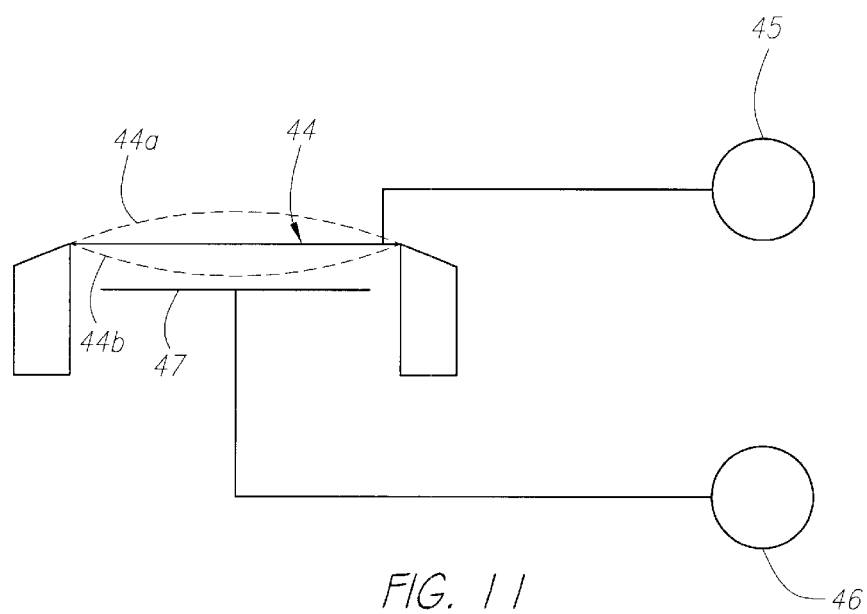
FIG. 11 is a diagrammatic illustration of an alternate embodiment of the wavefront sensor membrane mirror and driver shown in FIG. 9.

An alternate construction of the vibrating membrane mirror 32 is shown in FIG. 11 that uses electrostatic forces. Specifically, a membrane mirror 44 has a conductive reflective coating, which is electrically connected to a drive amplifier 45 capable of outputting positive and negative voltages. A fixed voltage is applied by another amplifier 46 to a stationary electrode 47 mounted near the membrane 44. When the mirror 44 and electrode have the same charge, the membrane deflects away from the electrode 47, as shown by dashed line 44a, but when the membrane mirror 44 and electrode 47 have the opposite charge, the membrane mirror 44 will deflect toward the electrode, as shown by dashed line 44b. By adjusting the amplifier 45, the amplitude and rate of vibration may be adjusted to match the seeing conditions of the AO system. The vibrating mirrors 32 and 44 both provide the pair of defocused images for operating the AO system. Since the pair of defocused images are provided at such a rapid rate, such as 4.0 kHz, the control of the deformable mirror by the wavefront sensor is nearly instantaneous (compared with the turbulence evolution time), continuous and in real time for correcting the wavefront of the data-encoded light received or transmitted by a transceiver of the present invention. Additional forms of wavefront curvature sensors are disclosed in the aforementioned U.S. patent application Ser. No. 09/579,786, although other wavefront sensors also may be used.

Figure 12:
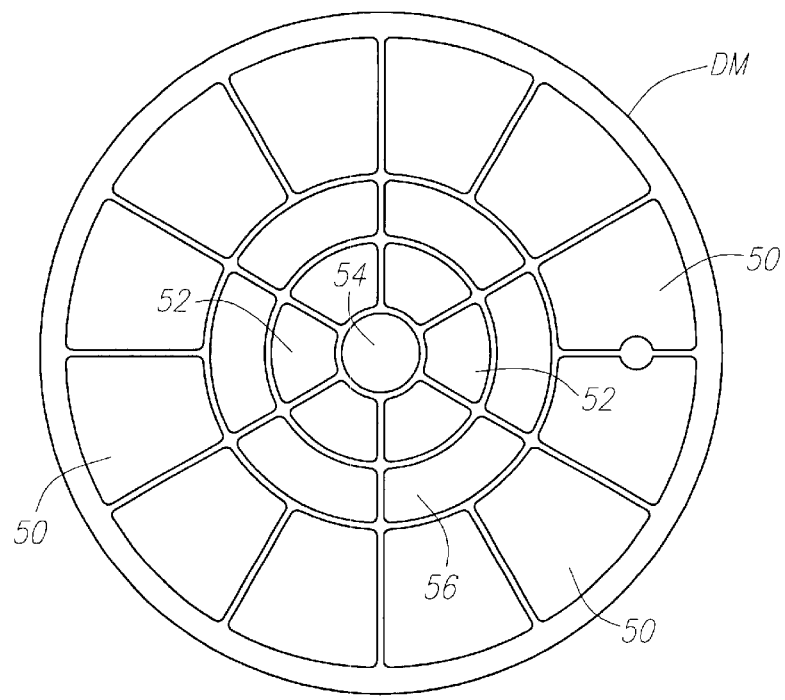
FIG. 12 is a diagrammatic elevation view of the actuator pattern on the back side of a typical deformable mirror for the adaptive optics system of the free-space optical data transmission system of the present invention.
Figure 13:
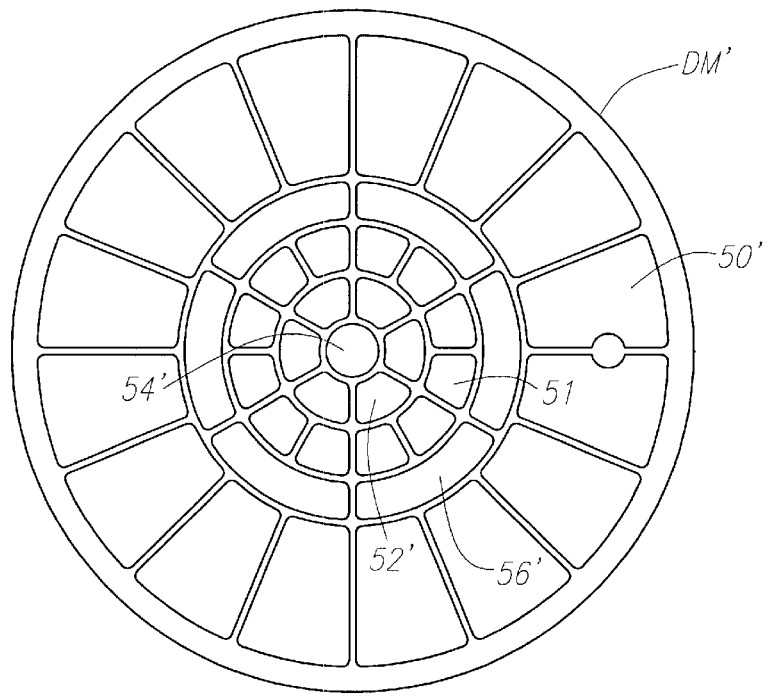
FIG. 13 is a diagrammatic elevation view similar to FIG. 12 but illustrating another actuator pattern for the deformable mirror.

FIGS. 12 and 13 illustrate typical electrode segment patterns that may be used on the back of the deformable curvature mirrors DM, DM' that are preferably used in the free-space optical data transmission system of the present invention. As described more fully in our aforementioned U.S. patent application Ser. No. 09/769,988, the deformable mirror DM preferably is comprised of two discs or plates (not shown) of any electro-restrictive material, such as PZT or PMN, that are laminated together with a mirror formed on one side and a pattern of electrode segments on the other side. Two typical such patterns are shown in FIGS. 12 and 13. As shown in FIG. 12, an outer ring of twelve electrode segments 50, an inner ring of six electrode segments 52 and a single central electrode segment 54 may be provided to thereby provide nineteen (19) separate electrode segments to which a high voltage potential may be separately applied and controlled to thereby control the deformation of the deformable mirror DM. The outer ring of electrode segments 50 is used for controlling the slope of the mirror by selectively applying voltages to each of those twelve segments. The inner ring of electrode segments 52 and central segment 54 are used to control the deformation of the mirror in that area, which is the area upon which the data-encoded light is directed, for correcting the wavefront curvature of the light. The wires W-1, W-2, W-3 through W-N that are described above with respect to FIG. 6 are connected separately to the electrode segments 50, 52 and 54 for applying the controlled voltages to each of those electrode segments. An intermediate ring of six conductive segments 56 is formed between the outer and inner rings of electrode segments 50 and 52, respectively, and these intermediate segments 56 are electrically grounded for preventing the buildup of an electrostatic charge on that portion of the deformable mirror that otherwise might cause undesirable expansion/contraction of the PZT or PMN and a resultant movement/deformation of the deformable mirror DM.

Similarly, the electrode pattern of FIG. 13 of deformable mirror DM' includes an outer ring of sixteen segments 50', a pair of concentric inner rings of twelve and six segments 51 and 52', respectively, and a single central electrode segment 54' to thereby provide thirty-five (35) electrode segments to which high voltages may be separately applied and controlled for deforming the deformable mirror DM. Again, the ring of outer segments 50' controls the slope of the mirror and the inner rings and central segments 51, 52' and 54' serve to deform the mirror for controlling the wavefront curvature. An intermediate ring of conductive segments 56' are grounded, as in the pattern of FIG. 12. It is to be understood and will appear to those skilled in the art that more or fewer electrode segments and grounding segments may be provided than are illustrated in FIGS. 12 and 13, and that the shape and orientation of the segments may also be varied.

Figure 14A:
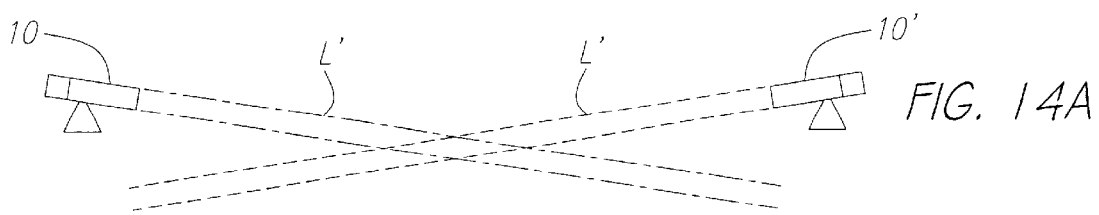
FIGS. 14A–14E are diagrammatic views illustrating the operating sequence for controlled aiming of the pair of transceivers at each other in the free-space optical data transmission system of the present invention.
Figure 14B:
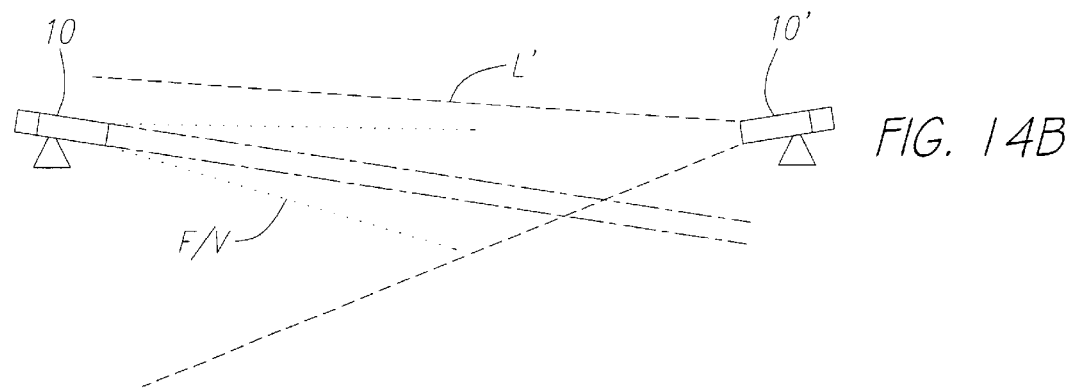
Figure 14C:
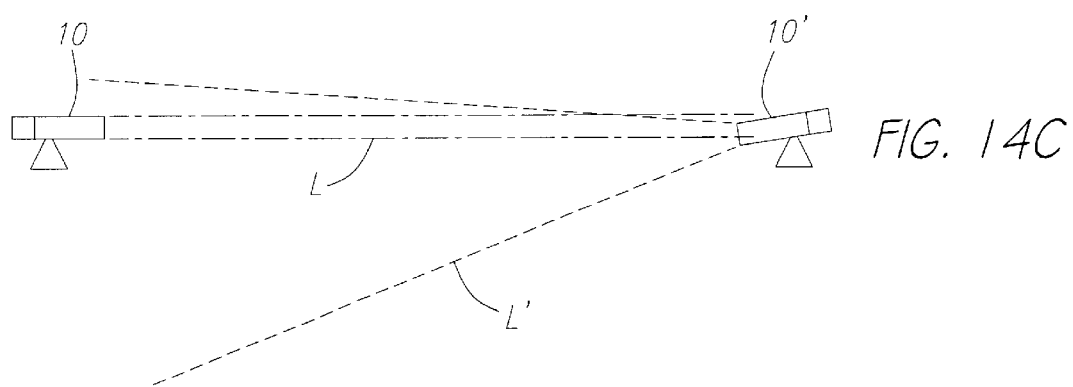
Figure 14D:
Figure 14E:
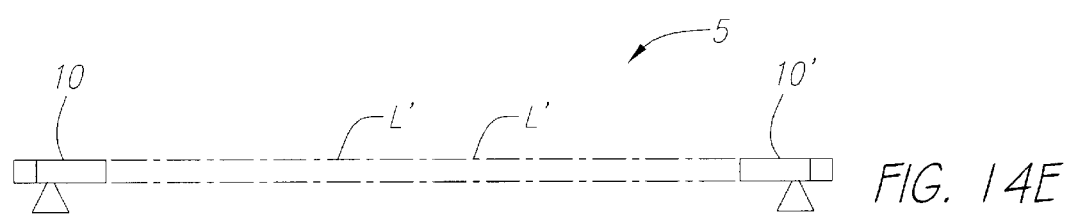

Referring now to FIGS. 14A–14E, a process is diagrammatically illustrated for establishing a communication link between two transceivers 10 and 10' of the free-space optical data transmission system of the present invention. When an optical communication link of this type is initially started or the communication link is broken as a result of transitory blockage or environmental conditions, such as heavy fog, an earthquake, a hurricane, a tall building having a transceiver swaying in high winds, or the like, the communication link must be established by accurately aiming the two transceivers, 10, 10' at each other and preferably that aiming procedure should be automatically performed whenever the transceivers are operating but not receiving light waves from each other. By the present invention, this automatic aiming and alignment may be performed in view of the ability of the wave front sensor WFS in each transceiver being capable of detecting a light signal, even under fairly weak illumination conditions as long as the required bandwidth is small. FIG. 14A diagrammatically illustrates a condition in which both transceivers 10, 10' are misaligned, that is, the respective light beams L and L' are aiming off the line-of-sight 12 (see FIG. 1) between the two transceivers. When such a condition is detected, such as by the receivers of each transceiver failing to receive any light while both transceivers are transmitting light, one transceiver 10' is operated to defocus its outgoing light beam by, for example, applying an appropriate offset to the control for the deformable mirror, to thereby cause some of the transmitted light L' to impinge upon the other transceiver 10, as shown in FIG. 14B. As an alternative, both transceivers 10, 10' may be operated to defocus the outgoing light beam, but the method will be described below as having only one light beam defocused for simplicity of explanation. Also, it should be noted that each wavefront sensor in a transceiver is provided with an adequate acquisition field of view F/V (shown as dotted lines in FIG. 14B for transceiver 10) for actually receiving light from the defocused light beam. The acquisition field of view F/V is a function of the wavefront sensor construction and, for example, for the wavefront sensor shown in FIG. 10 the acquisition field of view is determined by the size (diameter) of the membrane mirror 32. At present, for a data transmission system S of 1 to 2 km it is anticipated that an acquisition field of view of about 2 arc minutes will be adequate. Each transmitter preferably is provided with a power driven mechanism for appropriately changing the direction in which the transceiver is aimed, such as by the tip-tilt mirror 16, as described above with respect to FIG. 6, or the telescope may be mounted on a gimbal and aimed as illustrated in FIGS. 14A–14E. In response to the weak wavefront sensor signal induced in the transceiver 10 by the defocused light beam L' shown in FIG. 14B, the transceiver 10 slowly adjusts its aim to point at transceiver 10', as shown in FIG. 14C. The bandwidth of this adjustment is low due to the low illumination level at the aperture of the telescope of transceiver 10. The low bandwidth may also aid the system in relocking by averaging over the varying aperture illumination caused by scintillation. With the transceiver 10 accurately pointing at the transceiver 10', as shown in FIG. 14C, the transceiver 10' senses an increase in illumination and, in response thereto, turns on its adaptive optics loop at a low bandwidth and begins to remove the defocus from the light beam L', as shown in FIG. 14D, and starts aiming at transceiver 10. Both transceiver systems increase the bandwidth of adaptive optics correction as the wavefront sensor illumination levels increase during this aiming process until the transceivers 10 and 10' are accurately aimed at each other, as shown in FIG. 14E. Once the data transmission system is aligned, it is unlikely that realignment will be required during operation except upon the occurrence of disruptive conditions such as light beam blockage by fog or physical objects, such as a helicopter, light beam disruption by extreme turbulence events, such as wind, hurricanes, earthquakes, etc., or partial component failure. In any event, thereafter the data transmission system of the present invention will automatically realign itself in the aforedescribed manner illustrated in FIGS. 14A–14E.

For most applications of a free-space optical data transmission system, such as the system of the present invention, it is desirable that the data transmission be bi-directional, such as described with respect to FIGS. 2–5, for reasons of economy, although it is certainly possible to have separate systems for transmitting the data-encoded light in opposite directions. With a bi-directional data transmission system, the transmitted and perceived signals at each transceiver must be distinguishable (separable) to avoid any possibility of mixing the transmitted data-encoded light with the received data-encoded light, such as might occur by backscatter as a result of heavy fog. The present invention contemplates using one or more of at least five different physical methods for distinguishing/separating the incoming and the outgoing light beams from each other at each of the transceivers of the communication link, which five methods may be broadly categorized as follows:

(1) The use of wavelength separation;
(2) The use of orthogonal linear polarization or right- and left-handed circular polarization;
(3) The use of time domain multiplexing;
(4) The use of the light propagation direction; and
(5) The use of spatial diversity.

Some of these five methods will be described below in more detail with respect to specific embodiments illustrated in FIGS. 15–18, but it seems appropriate to briefly summarize each of those methods at this point in the disclosure. The first method of using wavelength separation involves using two different wavelengths of light being transmitted by the two transceivers with appropriate components associated with the receiver of each transceiver to discriminate between the wavelengths of the transmitted and received light. The second method of using polarization, linear or circular, includes the use of light polarizers with the transceivers for polarizing the light transmitted by each transceiver differently so that the polarized light that is received is distinguishable from that which is being transmitted by that transceiver. The third method of using time domain multiplexing includes the use of components with each transceiver to intermittently transmit and receive the light waves, that is, when one transceiver is transmitting the other transceiver is only receiving and vice-versa for short time periods. The fourth method of using the light propagation direction contemplates using a conventional fiber optic circulator to separate the light beams traveling in opposite directions by internal polarization and a Faraday rotator to separate counter-propagating light beams, although this method has the potential problem of being unable to separate backscattered transmitter light from the light received from the other transceiver. The fifth method of using spatial diversity contemplates the physical separation of the transmitted and received light beams within the telescope of each transceiver so that, for example, the transmitter, is offset from the optical axis of the system by a different direction and/or distance than the receiver is offset from the optical axis, which causes any enhanced backscatter of transmitted light to physically miss a receiver of the same transceiver. Specific examples of some of these methods will now be described with respect to FIGS. 15–18.

Figure 15:
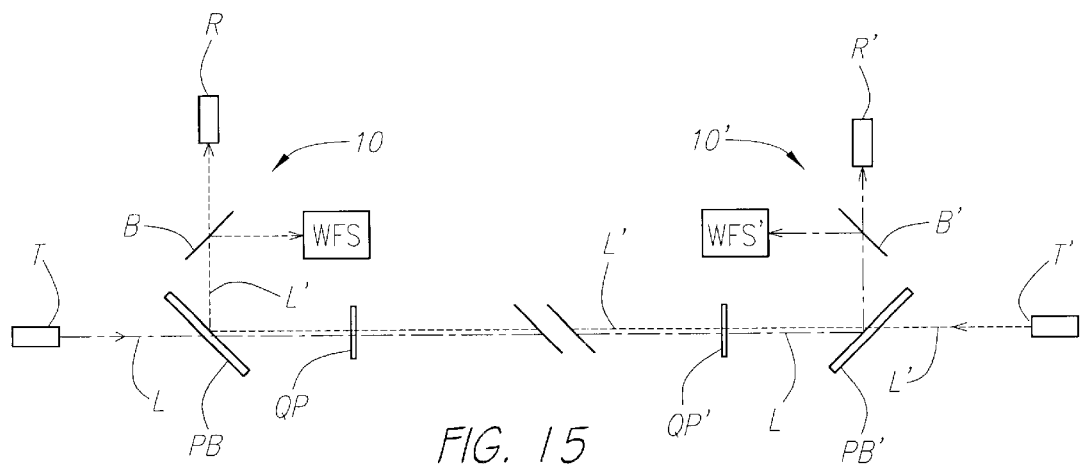
FIGS. 15, 16, 17 and 18 are diagrammatic illustrations of different embodiments of arrangements for separating and distinguishing the data-encoded light transmitted and received by each of the transceivers of the free-space optical data transmission system of the present invention.

FIG. 15 diagrammatically illustrates a light beam distinguishing/separating method for the outgoing and incoming light beams using polarization and quarter wave plates. Each transceiver 10, 10' is provided with a transmitter T, T', a receiver R, R', a wavefront sensor WFS, WFS' and a beamsplitter B, B' for proportioning the light waves between the receiver and wavefront sensor, all in a manner similar or identical to the transceivers described above. In addition, the transceivers 10, 10' include a polarizing beamsplitter PB, PB' and a quarter wave plate QP, QP' along the optical axis of the transmission of the data-encoded light. The light L (shown by a dot-dash lines) transmitted by the transmitter T of the first transceiver 10 passes through the polarizing beamsplitter PB, which allows the separation of opposite polarization states by transmitting one state and reflecting the other state out of the optical system. The light L then passes through quarter wave plate QP which turns the linear polarization state into circular polarization for propagating the light L to the telescope of the other transceiver 10' where it passes through another quarter wave plate QP' that returns the light L to its linear polarization with its orientation now at 90° with respect to the original polarization by the polarized beamsplitter PB. The light L then reflects off of a second polarized beamsplitter PB' to beamsplitter B' where a portion of the polarized light reflects from the beamsplitter B' to the wavefront sensor WFS' and the remaining portion passes through the beamsplitter B' to the receiver R'. Similarly, the transmitter T' of the second transceiver 10' transmits a light beam L' (shown by dashed lines) through the polarized beamsplitter PB', the quarter wave plate QP' and the quarter wave plate QP whereupon the polarization is 90° with respect to the original polarization by polarized beamsplitter BP' and therefore the light L' reflects from the polarized beamsplitter PB to the beamsplitter B where a portion of the light is reflected to the wavefront sensor WFS and the remaining portion of the light passes through the beamsplitter B to the receiver R of the transceiver 10. Thus, it may be seen that between the polarized beamsplitter PB, PB' and the quarter wave plate QP, QP' in each transceiver 10, 10' the light is polarized in perpendicular directions, i.e., the orientation of the received and transmitted polarized light is offset by 90°, whereby complete distinction/separation of the data-encoded light is achieved.

Figure 16:
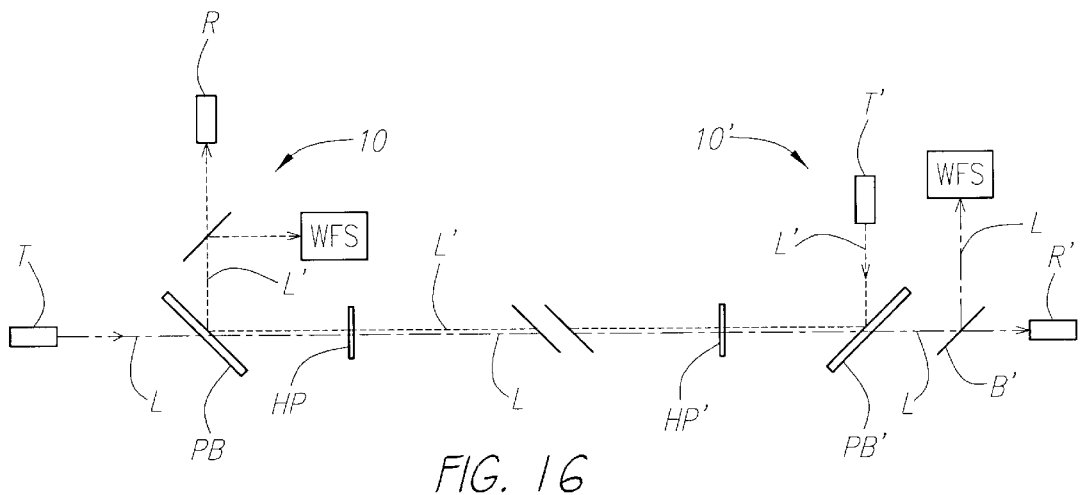

FIG. 16 illustrates a light beam distinguishing/separating arrangement similar to that which is shown in FIG. 15 and therefore the same components are labeled the same and only the differences between the two systems will be described. In this embodiment, each transceiver 10, 10' is provided with a half wave plate HP, HP' (rather than a quarter wave plate QP, QP' as shown in FIG. 15) each of which rotates the polarized light L, L' any desired amount for distinguishing/separating the outgoing and incoming light beams and, where necessary, to inhibit enhanced backscatter. The first transceiver 10 has its components in the same locations as in FIG. 15 but the second transceiver 10' has the components in different locations as a result of the different polarization caused by the half wave plates HP, HP'. Specifically, the transmitter T' of the second transceiver 10' is directed to the face of the polarizing beamsplitter PB' where polarized light L is reflected from the surface toward and through the half wave plate HP' and the half wave plate HP to the polarizing beamsplitter PB which reflects the light L' to the wavefront sensor WFS and receiver R of transceiver 10. Conversely, the light L from transmitter T of transceiver 10 passes through the beamsplitter PB, the half wave plate HP, the other half wave plate HP' and the polarized beamsplitter PB' to the beamsplitter B where a portion of the light L is reflected to the wavefront sensor WFS' and the remaining portion passes through the beamsplitter B' to reach the receiver R'. By adjusting the half wave plates HP, HP' to rotate the polarization only 22.5° during each pass therethrough, symmetry will be provided at both transceivers. Again, complete distinguishing/separating of the light beams L, L' is achieved so that light transmitted by a transceiver cannot be reflected back to the receiver thereof.

Figure 17:
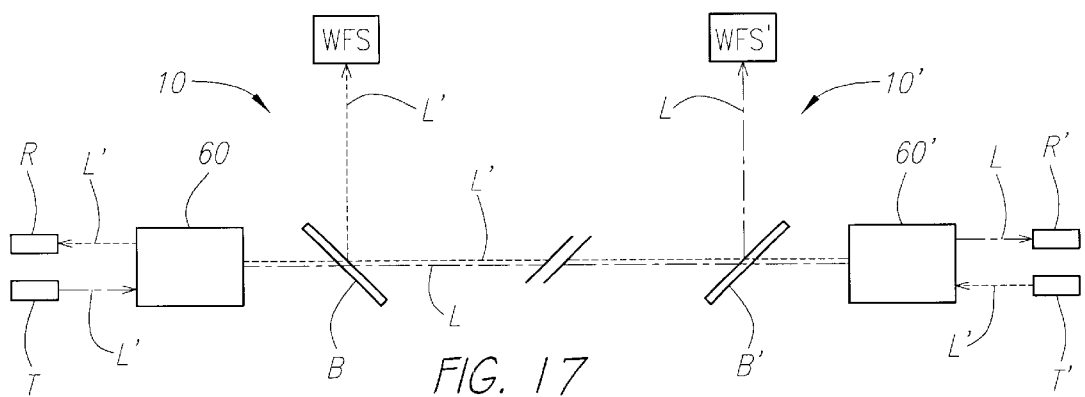

FIG. 17 illustrates another embodiment for distinguishing/separating the incoming and outgoing light beams in the respective transceivers 10 and 10' by using transmitted light beams of two different wavelengths from the two different transceivers 10, 10'. Here, the transceivers 10, 10' are each provided with a fiber wavelength division multiplexer (WDM) or an optical fiber circulator 60, 60' through which both the transmitted and received light passes. The light L from transmitter T of the first transceiver 10 passes through the fiber wavelength division multiplexer or circulator 60 then through the beamsplitter B to the beamsplitter B' of the second transceiver 10' where a portion of the light L is reflected to the wavefront sensor WFS' and the remaining portion passes through the beamsplitter B' to the WDM or circulator 60' that separates the light L of a given wavelength from other light and transmits that light L to receiver R' of the second transceiver 10'. Similarly, light L' of a different wavelength than light L is transmitted by transmitter T' of the second transceiver 10' through the WDM or circulator 60' and through the beamsplitter B' to beamsplitter B of the other transceiver 10 where a portion of the light L' is reflected to the wavefront sensor WFS and the remaining portion passes through beamsplitter B to the WDM or circulator 60 which delivers only the light L' of that wavelength to the receiver R. Although any number of different wavelengths may be used for accomplishing the distinguishing/separating function by this embodiment, it is preferred to use two wavelengths in the 1,550 nm "C" band, although light of 1,310 nm and 1,550 nm wavelengths may be used.

Figure 18:
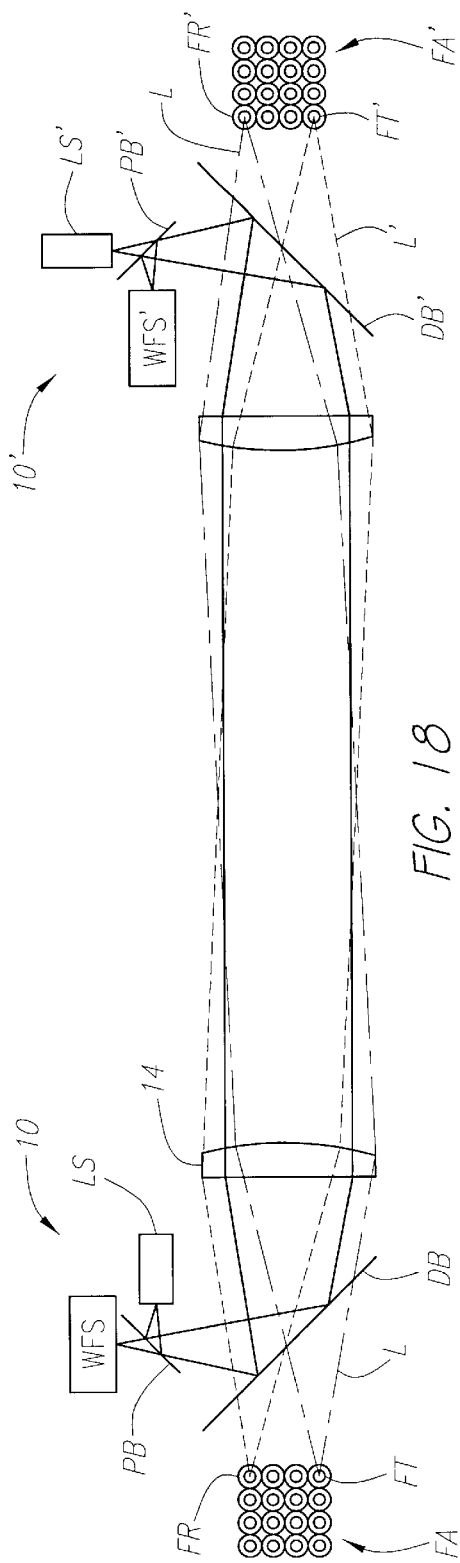

FIG. 18 diagrammatically illustrates still another embodiment for distinguishing/separating the data-encoded light being transmitted and received by a transceiver and this embodiment uses the method of spatial separation described briefly above. Again, each transceiver 10, 10' includes a telescope 14, 14' and a wavefront sensor WFS, WFS'. For the operation of the wavefront sensors WFS, WFS' and the associated deformable mirrors (not shown) in this embodiment, a separate reference light source LS, LS' may be used and will be so described, even though the data-encoded light may be used, as in the previously described embodiments. The reference light (shown by solid lines) from light source LS is reflected off of a polarizing beamsplitter PB to a dichroic beamsplitter DB and then through the telescope 14 to the telescope 14' of the second transceiver 10' where the reference light is reflected off of the second dichroic beamsplitter DB' to the second polarized beamsplitter PB' where the polarized reference light is reflected to the wavefront sensor WFS' for operating the adaptive optics system of transceiver 10'. Similarly, the reference light source LS' (also the same solid lines) of the second transceiver 10' transmits a reference light through the polarized beamsplitter PB' that is reflected from the dichroic beamsplitter DB' through the telescopes 14', 14 to the dichroic beamsplitter DB where it is reflected through the polarized beamsplitter PB to the wavefront sensor WFS to operate the adaptive optics system of the transceiver 10. The use of polarized light in the reference light beams supplied by the light sources LS, LS' eliminates the backscatter of light from entering the wavefront sensors WFS, WFS' and the use of different wavelengths for the reference light LS, LS' than the data-encoded light provides the function of distinguishing/separating therebetween. Each transceiver 10, 10' is provided with a matching fiber array FA, FA' for transmitting and receiving the data encoded light. For example, without limiting the scope of the present invention, FIG. 18 illustrates sixteen (16) optic fibers in each fiber array FA, FA' and the lower half (two rows of four fibers) of each fiber array FA, FA' comprises the fibers for transmitting the data encoded light, and the upper one-half (two rows of four fibers) provide the receivers for the rays of light from the other transceiver. Specifically, a fiber FT of the first transceiver 10 transmits the light L (long-dash and short-dash lines) through the dichroic beamsplitter DB, the two telescopes 14, 14' and the other dichroic beamsplitter DB' to a matched fiber receiver FR' in the second transceiver 10'. Similarly, a fiber transmitter FT' of the second transceiver 10' transmits light L' (dashed lines) through both dichroic beamsplitters and telescopes to a fiber receiver FR of the other transceiver 10 at a corresponding location. The remaining fibers of each fiber array FA, FA' are similarly matched such that the optical system directs the light from one fiber transmitter FT, FT' to only one fiber receiver FR', FR, respectively. Thus, the transmitted and received light beams are physically separated by being positioned in separate locations in each transceiver thereby allowing bi-directional data transmission.

Figure 19:
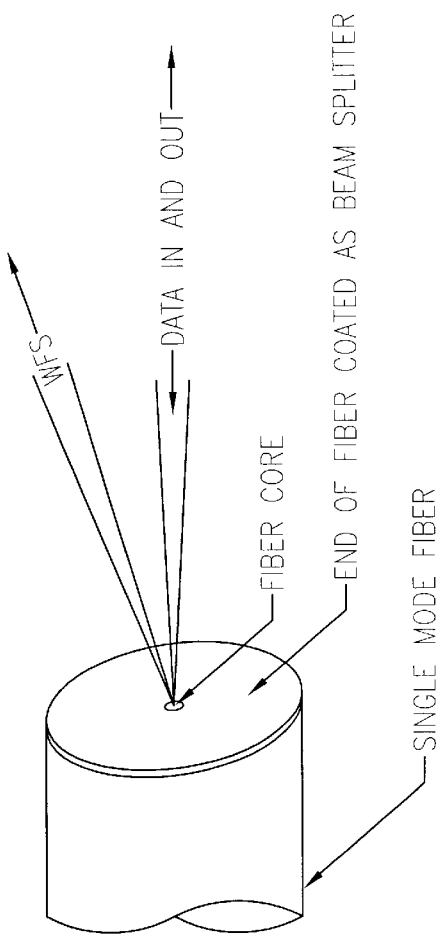
FIG. 19 is an enlarged diagrammatic illustration of one possible, simplified embodiment a fiber optic element for transmitting and receiving the data-encoded light and splitting the light for the wavefront sensor and data receiver in the transceivers of the free-space optical data transmission system of the present invention.

FIG. 19 is a highly enlarged view of an optic fiber embodiment that may be used in the free-space optical data transmission system of the present invention for sharing the data-encoded light beam between the receiver and the wavefront sensor, rather than using a beamsplitter to separate the light beam. The end of the optic fiber is polished at a small angle to the axis and is coated as a beamsplitter whereby light falling on any part of the end of the fiber will be reflected toward the wavefront sensor for providing light for that function. The coating on the end of the fiber may be neutral or dichroic for wavelength separation. When the light is centered on the core of the optic fiber, the light is split either spectrally with a dichroic beam splitter or with a neutral coating for accomplishing the function of distinguishing/separating the incoming and outgoing light beams in a bidirectional data transmission arrangement.

Figure 20:
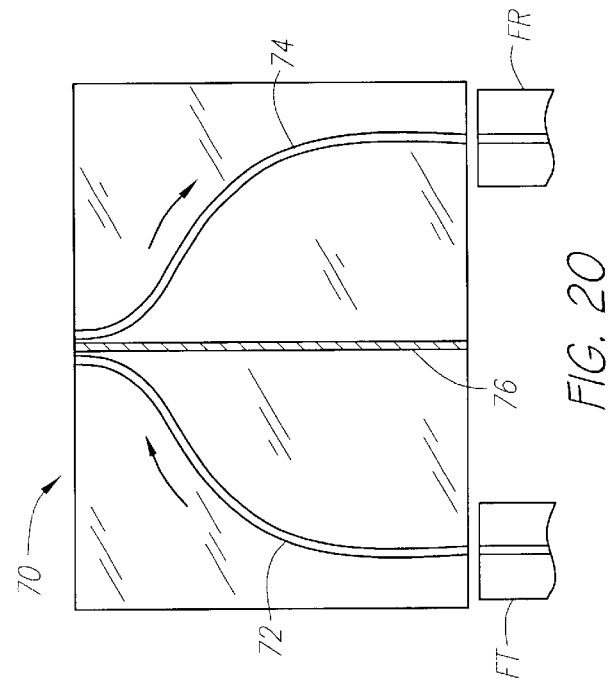
FIG. 20 is an enlarged diagrammatic illustration of one embodiment for physically separating the transmitted and received data-encoded light beams by the use of an integrated optical wave guide.

FIG. 20 illustrates another arrangement for physically separating the transmitted and received light beams in a bi-directional data transmission system. An integrated optical wave guide 70 is fabricated by laying down a pattern of dielectric materials on a substrate to form the desired optical wave guide pattern or, in the alternative, small air-filled channels 72 and 74 may be formed in the wave guide 70 and coated with an appropriate metallic or dielectric reflective layer. A physical barrier 76 is preferably provided in the wave guide between the air passages 72 and 74. The light may be transmitted from an optic fiber FT through passage 72 and the received light may be received by an optic fiber FR from the passage 74.

Referring now to FIG. 21, the effects of divergence of plural light beams is diagrammatically illustrated. Assuming that a free-space optical data transmission system of the present invention has a transceiver (not shown) having four optic fiber transmitters FT (not shown) similar to the arrangement illustrated in FIG. 18, the data encoded light from each of the fiber transmitters will diverge over the distance of transmission, shown diagrammatically compressed from left to right in FIG. 21. At one intermediate distance, the four light beams illustrated by the four solid rings 80 will have diverged a certain amount but will still be overlapping whereas at a further distance, the four light beams will have diverged to a point where they do not overlap as shown by the solid rings 80' at the right end of FIG. 21. The entrance aperture 82' of the receiving telescope 14' will receive a substantial proportion of the light beams of the overlapping rings 80 at the intermediate location which will be acceptable, whereas at a greater distance only a small portion of the light of each beam (rings 80') will be received by the telescope 14' and, at some point, the light losses will be unacceptable. It is anticipated that the transmitting distance between telescopes 14 and 14' should not exceed a point where at least one-half of the light beam represented by each ring 80 is received by the telescope 14'.

By the foregoing descriptions and the attached drawings, a free-space optical data transmission system has been disclosed that is capable of efficient and accurate transmission of data-encoded light through the atmosphere by correcting for atmospheric aberrations through the use of adaptive optics, and the data transmission may be bidirectional by using means for distinguishing/separating the transmitted and received light beams.

We claim:

1. A free-space optical data transmission system, comprising:

first and second telescopes spaced from and aimed at each other, a light transmitter operably coupled to the first telescope for providing data-encoded light to the first telescope which directs that data-encoded light across a first free-space optical path to the second telescope, a light receiver operably coupled to the second telescope for receiving the data-encoded light from the first telescope, a first adaptive optics system provided with the first telescope for determining characteristics of a wavefront of light transmitted from the second telescope across a second free-space optical path to the first telescope and pre-correcting a wavefront of the data-encoded light in response to said characteristics, wherein the second free-space optical path and the first free-space optical path encounter substantially the same aberrations, and second adaptive optics system provided with the second telescopes for determining characteristics of a wavefront of light transmitted from the first telescope across the first free-space optical path to the second telescope and correcting a wavefront of the data-encoded light in response to said characteristics.

2. The system of claim 1, wherein both said telescopes have both said light transmitter and a said light receiver operably coupled to the telescope.

3. The system of claim 2, wherein operably coupled to each said telescope is means for distinguishing/separating the data-encoded light transmitted therefrom and the data-encoded light received thereby.

4. The system of claim 1, wherein a separate reference light is transmitted from the first telescope across the first free-space optical path to the second telescope and received by said second adaptive optics system for determining the wavefront characteristics.

5. The system of claim 1, wherein a probe light beam transmitter is provided with said second telescope for providing the light transmitted from the second telescope across the second free-space optical path to the said first telescope for determining the wavefront characteristics.

6. The system of claim 5, wherein said probe light beam is of a different wavelength than the data-encoded light.

7. The system of claim 1, wherein the beam of data-encoded light is sized to isolate the effects of each said adaptive optics system from the other adaptive optics system.

8. The system of claim 7, wherein the phase effects of the data-encoded light transmitted from one telescope are transformed into intensity effects at the other telescope.

9. A free-space optical data transmission system, comprising:

first and second telescopes spaced from and aimed at each other, a light transmitter operably coupled to the first telescope for providing data-encoded light to the first telescope which directs that data-encoded light to the second telescope, a light receiver operably coupled to the second telescope for receiving the data-encoded light from the first telescope, a wavefront curvature sensor provided with at least one of the telescopes for determining characteristics of the wavefront of light transmitted from the first telescope to the second telescope from defocused pupil images, and a deformable curvature mirror operably coupled to the wavefront curvature sensor and positioned in the path of the data-encoded light for modifying the wavefront of the data-encoded light in response to the wavefront characteristics determined by the wavefront curvature sensor.

10. The system of claim 9, wherein both said telescopes have both said light transmitter and a said light receiver operably coupled to the telescope.

11. The system of claim 10, wherein a said wavefront curvature sensor and a said deformable curvature mirror is provided with each said telescope.

12. The system of claim 11, wherein the beam of data-encoded light transmitted by each said transmitter is of a size to isolate the effects of each wavefront curvature sensor and deformable curvature mirror from the other wavefront curvature sensor and deformable curvature mirror.

13. The system of claim 10 or 11, wherein operably coupled to each said telescope is means for distinguishing/separating the data-encoded light transmitted therefrom and the data-encoded light received thereby.

14. The system of claim 9, wherein said wavefront curvature sensor and deformable curvature mirror are provided with said second telescope.

15. The system of claim 9, wherein the phase effects of the data-encoded light transmitted from one telescope are transformed into intensity effects at the other telescope.

16. The system of claim 9, wherein a separate reference light is transmitted between the telescopes and received by said wavefront curvature sensor for determining the wavefront characteristics, and said separate reference light has a different wavelength than said data-encoded light.

17. The system of claim 9, wherein said wavefront curvature sensor comprises:

a vibrating mirror for producing the defocused pupil images, and a detector positioned to detect the defocused pupil images.

18. The system of claim 9 or 17, wherein the deformable curvature mirror comprises:

first and second parallel plates of an electro-restrictive material, said first and second plates laminated together, said first plate having an outer surface and a mirrored surface on said first plate outer surface, and said second plate having an outer surface with a pattern of electrode segments on said second plate outer surface, each said segment having a separate electrical terminal for applying a variable electrical voltage thereto for selectively deforming the deformable curvature mirror.

19. A free-space optical data transmission system, comprising:

first and second transceivers spaced at a substantial distance from each other;

each transceiver having a telescope pointed at the telescope of the other transceiver, each transceiver having a light transmitter and a light receiver operably connected to the telescope of that transceiver for transmitting and receiving, respectively, data-encoded light to and from the other telescope, a second adaptive optics system provided with the second transceiver for determining characteristics of a wavefront of light transmitted from the first transceiver across a first free-space optical path to the second transceiver and correcting a wavefront of the data-encoded light received by the second transceiver in response to said characteristics, a first adaptive optics system provided with the first transceiver for determining characteristics of a wavefront of light transmitted from the second transceiver across a second free-space optical path to the first transceiver and pre-correcting a wavefront of the data-encoded light transmitted from the first transceiver in response to said characteristics, wherein the second free-space optical path and the first free-space optical path encounter substantially the same aberrations, and each said transceiver having means for distinguishing/separating between the data-encoded light transmitted therefrom and the data-encoded light received from the other transceiver.

20. The system of claim 19, wherein said means for distinguishing/separating the transmitted light and received light in each transceiver comprises means for transmitting light of different wavelengths from the light transmitter of each said transceiver.

21. The system of claim 20, wherein said means for distinguishing/separating further comprises means in each transceiver for separating the light received by its wavelength.

22. The system of claim 20, wherein said means for distinguishing/separating further comprises a fiber wavelength division multiplexer.

23. The system of claim 19, wherein said means for distinguishing/separating the transmitted light and received light in each transceiver comprises means for polarizing the light transmitted by the light transmitter of each transceiver in a different polarization than the polarization of the light received at that transceiver.

24. The system of claim 23, wherein said means for distinguishing/separating further comprises a quarter wave plate provided with each transceiver.

25. The system of claim 23, wherein said means for distinguishing/separating further comprises a half wave plate provided with each transceiver.

26. The system of claim 23, 24 or 25, wherein said means for distinguishing/separating further comprises polarized beamsplitters provided with each transceiver.

27. The system of claim 19, wherein said means for distinguishing/separating the transmitted light and the received light in each transceiver comprises means for time domain multiplexing of the light transmitter by each said light transmitter.

28. The system of claim 19, wherein said means for distinguishing/separating the transmitted light and the received light in each transceiver comprises means for separating light beams traveling in opposite directions to and from a transceiver.

29. The system of claim 28, wherein said means for separating light beams further comprises a light circulator.

30. The system of claim 19, wherein said means for distinguishing/separating the transmitted light and the received light in each transceiver comprises means in each transceiver for spatially separating the location of the light transmitter and the light receiver.

31. The system of claim 30, wherein in each transceiver the light transmitter comprises a first optic fiber and the light receiver comprises a second optic fiber laterally spaced from said first optic fiber.

32. The system of claim 30, wherein each transceiver is provided with a plurality of light transmitters in first predetermined locations and a plurality of light receivers in second predetermined locations separate from said first predetermined locations.

33. The system of claim 32, wherein each telescope optically directs received light to said light receivers operably connected to that said telescope.

34. The system of claim 32 or 33, wherein said plurality of light receivers comprise an array of optic fibers.

35. The system of claim 34, wherein said plurality of light transmitters comprises an array of optic fibers.

36. The system of claim 32, said plurality of light transmitters comprises an array of optic fibers.

37. The system of claim 19, wherein a plurality of said light transmitters are provided with at least one of said transceivers, and means are provided for coherence management of the plural beams of transmitted light.

38. The system of claim 19, wherein a plurality of said light receivers are provided with at least one of said transceivers, and means are provided for coherence management of the plural beams of received light.

39. The system of claim 37 or 38, wherein said coherence management means comprises at least one of means for causing light path delays, incoherent optical amplifiers and OE or OEO conversion.

40. A free-space optical data transmission system, comprising:
a pair of transceivers spaced at a substantial distance from at each other;
each transceiver having a telescope pointed at the telescope of the other transceiver,
each transceiver having a light transmitter and a light receiver operably connected to the telescope of that transceiver for transmitting and receiving, respectively, data-encoded light to and from the other telescope,
each said transceiver having means for distinguishing/separating between the data-encoded light transmitted therefrom and the data-encoded light received from the other transceiver,
a wavefront curvature sensor provided with each of said transceivers for determining the characteristics of the wavefront of light transmitted from one transceiver to the other transceiver having that wavefront curvature sensor, the wavefront curvature sensor determining the characteristics of the wavefront of light from defocused pupil images, and
a deformable curvature mirror provided with each transceiver and operably connected to the wavefront curvature sensor provided in that transceiver, said deformable curvature mirror positioned in the path of the data-encoded light received by that transceiver for compensating for the wavefront of the data-encoded light in response, at least in part, to the wavefront characteristics determined by the wavefront curvature sensor to which that deformable curvature mirror is operably connected.

41. The system of claim 40, wherein each said transceiver further comprises means for deformable curvature mirror conjugation.

42. The system of claim 40, wherein each said transceiver is provided with a plurality of said wavefront curvature sensors and said deformable curvature mirrors.

43. The system of claim 42, wherein each said transceiver further comprises means for deformable curvature mirror conjugation of each said deformable curvature mirror.

44. The system of claim 40, wherein a separate reference light is transmitted between the telescopes and received by said wavefront curvature sensor for determining the wavefront characteristics.

45. The system of claim 40, wherein said wavefront curvature sensor comprises:
a vibrating mirror for producing the defocused pupil images, and
a detector positioned to detect the defocused pupil images.

46. The system of claim 40 or 45, wherein the deformable curvature mirror comprises:
first and second parallel plates of an electro-restrictive material, said first and second plates laminated together, said first plate having an outer surface and a mirrored surface on said first plate outer surface, and said second plate having an outer surface with a pattern of electrode segments on said second plate outer surface, each said segment having a separate electrical terminal for applying a variable electrical voltage thereto for selectively deforming the deformable curvature mirror.

47. The system of claim 40, wherein said means for distinguishing/separating the transmitted light and received light in each transceiver comprises means for transmitting light of different wavelengths from the light transmitter of each said transceiver.

48. The system of claim 40, wherein said means for distinguishing/separating the transmitted light and received light in each transceiver comprises means for polarizing the light transmitted by the light transmitter of each transceiver in a different polarization than the polarization of the light received at that transceiver.

49. The system of claim 40, wherein said means for distinguishing/separating the transmitted light and the received light in each transceiver comprises means for time domain multiplexing of the light transmitter by each said light transmitter.

50. The system of claim 40, wherein said means for distinguishing/separating the transmitted light and the received light in each transceiver comprises means for separating light beams traveling in opposite directions to and from a transceiver.

51. The system of claim 40, wherein said means for distinguishing/separating the transmitted light and the received light in each transceiver comprises means in each transceiver for spatially separating the location of the light transmitter and the light receiver.

52. The system of claim 40, wherein a plurality of said light transmitters are provided with at least one of said transceivers, and means are provided for coherence management of the plural beams of transmitted light.

53. The system of claim 40, wherein a plurality of said light receivers are provided with at least one of said transceivers, and means are provided for coherence management of the plural beams of received light.

54. The system of claim 52 or 53, wherein said coherence management means comprises at least one of means for causing light path delays, incoherent optical amplifiers and OE or OEO conversion.

55. The system of claim 40, wherein the beam size is adjusted such that the phase effects of the data-encoded light transmitted from one telescope are transformed into intensity effects at the other telescope.

56. The system of claim 40, wherein the beam of data-encoded light transmitted by each said transmitter is of a size to isolate the effects of each wavefront curvature sensor and deformable curvature mirror from the other wavefront curvature sensor and deformable curvature mirror.

* * * * *